US012681121B2

(12) United States Patent
Ekhaus

(10) Patent No.: US 12,681,121 B2
(45) Date of Patent: Jul. 14, 2026

(54) ANGLE AMBIGUITY MITIGATION FOR INTERFEROMETRY

(71) Applicant: BAE SYSTEMS Information and Electronic Systems Integration Inc., Nashua, NH (US)

(72) Inventor: Ira B. Ekhaus, Arlington, MA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 352 days.

(21) Appl. No.: 18/494,332

(22) Filed: Oct. 25, 2023

(65) Prior Publication Data

US 2025/0138130 A1     May 1, 2025

(51) Int. Cl.
*G01S 3/46*          (2006.01)

(52) U.S. Cl.
CPC ...................................... *G01S 3/46* (2013.01)

(58) Field of Classification Search
None
See application file for complete search history.

(56) References Cited

U.S. PATENT DOCUMENTS 5,343,212 A * 8/1994 Rose ........................ G01S 11/04
342/458
2007/0222667 A1 * 9/2007 Burlet ..................... G01S 7/292
342/146

OTHER PUBLICATIONS

Younger, J.P. and Reid, I.M., "Interferometer angle-of-arrival determination using precalculated phases," Radio Science, AGU Publications, (Sep. 1, 2017). pp. 1058-1066.

* cited by examiner

*Primary Examiner* — Whitney Moore
(74) *Attorney, Agent, or Firm* — Gary McFaline

(57) ABSTRACT

Techniques are provided for mitigating interferometric angle ambiguity. A methodology implementing the techniques according to an embodiment includes measuring a differential phase of a signal received at an interferometer baseline; calculating a Gaussian conditional probability of an angle of arrival of the signal based on the differential phase; calculating an angular position probability of an object in a target reference frame based on the conditional probability; aggregating the angular position probability with previously calculated angular position probabilities (based on previously selected baselines) to generate a current angular position probability; selecting a next baseline and iterating the process to calculate a next angular position probability; and selecting an angular position probability of greatest likelihood, from the current and previously calculated angular position probabilities, based on an amplitude of the Gaussian distributions, such that the selected angular position probability is associated with a disambiguated angular position of the object.

20 Claims, 16 Drawing Sheets

Angle Ambiguity
Mitigation System
140

First
Baseline

Phase Measurement
Circuit
200

AOA Conditional
Probability Calculator
210

Iterate For
Next Baseline

Angular Position
Probability Calculator
220

Iteration
Circuit
240

Recursive Baseline
Aggregation Calculator
230

Probability Lobes
235

Likelihood Sorting
Circuit
250

Disambiguated
Angle
260

Angle Ambiguity Mitigation
System Implementation
100

Two Element Interferometer
300

Phase Wrap Ambiguity
400

$\hat{\beta}(\phi_{measured} = 0, N_{wrap})$

Four Element Interferometer
500

Colinear Interferometer array
600

Coplanar Interferometer array
700

3D Generalization of
Two Element Interferometer
1000

3D Generalization of Canted
Two Element Interferometer
1100

3D Generalization of Canted
Three Element Interferometer
1200

1500

Processing Platform
1600

ANGLE AMBIGUITY MITIGATION FOR INTERFEROMETRY

FIELD OF DISCLOSURE

The present disclosure relates to interferometry, and more particularly to mitigation of angular ambiguity arising from processing of multiple interferometric baselines.

BACKGROUND

Interferometers, comprising two or more pairs of antenna elements located along a baseline, are used to estimate differential time and phase between signals that are received at the antenna elements. The differential time and phase may then be used to estimate an angle of arrival of the signal to aid in locating an object acting as either a signal source/emitter or a target reflecting transmitted signals. Angle estimates based on these differential phase/time measurements, are subject to ambiguity, due to phase wrapping at periodic multiples of the signal wavelength. These ambiguities need to be resolved so that a single, unambiguous estimate of the angle of arrival may be obtained.

Figure 1:
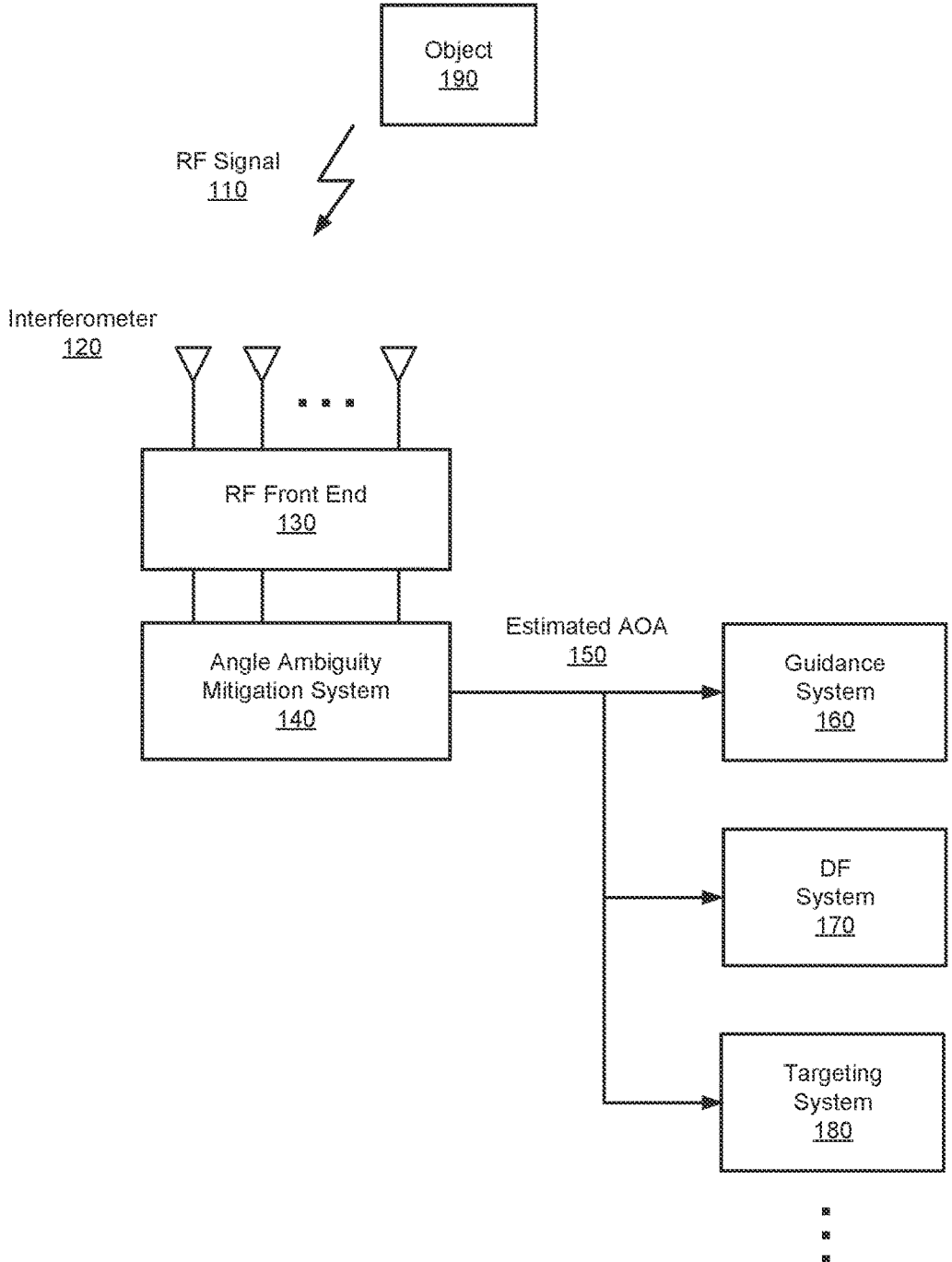
FIG. 1 illustrates an implementation of an angle ambiguity mitigation system for interferometry, in accordance with certain embodiments of the present disclosure.

Although the following Detailed Description will proceed with reference being made to illustrative embodiments, many alternatives, modifications, and variations thereof will be apparent in light of this disclosure.

DETAILED DESCRIPTION

Techniques are provided herein for the mitigation of angular ambiguity arising from processing of multiple interferometric baselines. As noted above, interferometers are used to estimate differential time and phase between signals that are received at two or more pairs of antenna elements, which may then be used to estimate an angle of arrival of the signal (AOA), for example to locate an object, which can be an emitter or a target that is reflecting transmitted energy. Angle estimates based on these differential phase/time measurements, are subject to ambiguity, due to phase wrapping at periodic multiples of the signal wavelength 2 . . . . These ambiguities need to be resolved so that a single, unambiguous estimate of the AOA may be obtained.

To this end, and in accordance with an embodiment of the present disclosure, an angle ambiguity mitigation system is disclosed to improve the estimation of the location of an object by reducing interferometric angle ambiguity associated with phase wrap. The disclosed techniques calculate and combine conditional probabilities of differential phase values, across multiple baselines of the interferometer, to identify a phase value of greatest likelihood that resolves the phase wrap ambiguity.

In accordance with an embodiment, a methodology for mitigating interferometric angle ambiguity includes measuring a differential phase of a signal received at a currently selected baseline from a plurality of baselines of an interferometer. The method also includes calculating a conditional probability of an AOA of the signal based on the measured differential phase. The conditional probability is modelled as a Gaussian distribution. The method further includes calculating an angular position probability of an object in a target frame of reference based on the conditional probability of the AOA. The method further includes aggregating the angular position probability with previously calculated angular position probabilities to generate a current angular position probability. The previously calculated angular position probabilities are based on previously selected baselines of the plurality of baselines. The method further includes selecting a next baseline of the plurality of baselines as the currently selected baseline and iterating the process to calculate a next angular position probability based on the selected next baseline. The method further includes selecting an angular position probability of greatest likelihood, from the current and the previously calculated angular position probabilities, based on an amplitude of the Gaussian distributions. The selected angular position probability is associated with the disambiguated angular position of the object.

It will be appreciated that the techniques described herein may provide improved angle ambiguity mitigation (and corresponding direction finding capability), compared to systems that reduce ambiguity on a per direction basis by relying on limited types of interferometry configurations such as parallel baselines comprising colinear elements. Numerous embodiments and applications will be apparent in light of this disclosure.

System Architecture

FIG. 1 illustrates an implementation 100 of an interferometric angle ambiguity mitigation system 140, in accordance with certain embodiments of the present disclosure. The implementation 100 is shown to include an interferometer 120, an RF front end 130, the angle ambiguity mitigation system 140, and clients/consumers of the estimated AOA 150 generated by the angle ambiguity mitigation system 140. In some embodiments, the clients may include a guidance system 160, a direction finding (DF) system 170, and/or a targeting system 180, to name just a few possibilities. In some embodiments, the system may be generalized to include signals other than RF signals, such as, for example, acoustic signals. In such case, the RF front end may be generalized to a signal frontend.

The interferometer 120 comprises two or more baselines. Each baseline comprises two spatially separated antenna elements, as illustrated for example in FIG. 3, which are configured to receive RF signals 110. The RF signals may be transmitted from any number of signal sources (e.g., objects 190) that can be positioned at any location. In some embodiments, the RF front end 130 is configured to convert the received RF signals down to an intermediate frequency (IF) signal or a baseband signal and perform any suitable filtering such as matched template or bandpass filtering, amplification, and analog to digital conversion.

The angle ambiguity mitigation system 140 is configured to improve estimation of the location of the object 190 location by reducing interferometric angle ambiguity that arises from phase wrap. The angle ambiguity mitigation system 140 combines conditional probabilities of differential phase values, across multiple baselines of the interferometer, to identify a phase value of greatest likelihood that resolves the phase wrap ambiguity, as will be explained in greater detail below.

Figure 2:
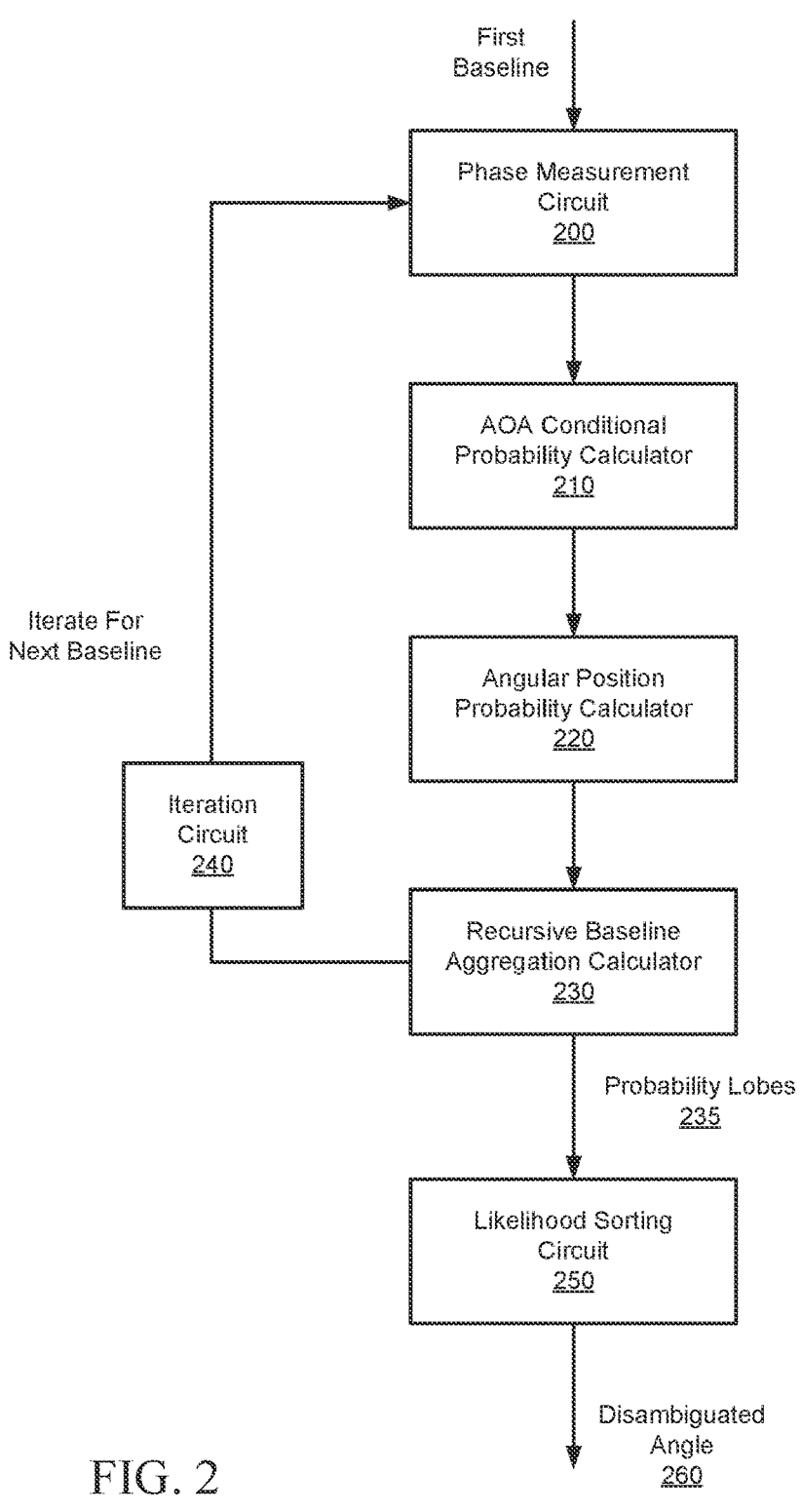
FIG. 2 is a block diagram of the angle ambiguity mitigation system of FIG. 1, configured in accordance with certain embodiments of the present disclosure.

FIG. 2 is a block diagram of the angle ambiguity mitigation system 140 of FIG. 1, configured in accordance with certain embodiments of the present disclosure. The angle ambiguity mitigation system 140 is shown to include a phase measurement circuit 200, an AOA conditional probability calculator 210, an angular position probability calculator 220, a recursive baseline aggregation calculator 230, an iteration circuit 240, and a likelihood sorting circuit 250.

The angle ambiguity mitigation system 140 will be described in greater detail below, but at a high level, the components of the angle ambiguity mitigation system 140 can be described as follows. The phase measurement circuit 200 is configured to measure a differential phase of a signal received at a first one of the baselines of the interferometer. The differential phase is the phase difference between the two antenna elements of the baseline. The differential phase will be ambiguous due to phase wrap.

The AOA conditional probability calculator 210 is configured to calculate a conditional probability of the AOA of the signal based on the measured differential phase of a particular baseline pair reception. At typical SNR values associate with interferometry, the conditional probability can be modeled as a Gaussian distribution having a calculated mean and variance.

The angular position probability calculator 220 is configured to calculate an angular position probability of the object in a target frame of reference based on the conditional probability of the AOA, for example by performing a rotation operation.

The recursive baseline aggregation calculator 230 is configured to aggregate the angular position probability with previously calculated angular position probabilities to generate a current angular position probability. The previously calculated angular position probabilities are based on previously selected baselines of the interferometer.

The iteration circuit 240 is configured to select a next baseline of the interferometer, that has not yet been processed, as the currently selected baseline to iteratively calculate a next angular position probability.

The likelihood sorting circuit 250 is configured to select an angular position probability of greatest likelihood, from the current and the previously calculated angular position probabilities, based on amplitudes of the Gaussian distributions. The selected angular position probability is associated with the disambiguated angular position 260 of the object.

Figure 3:
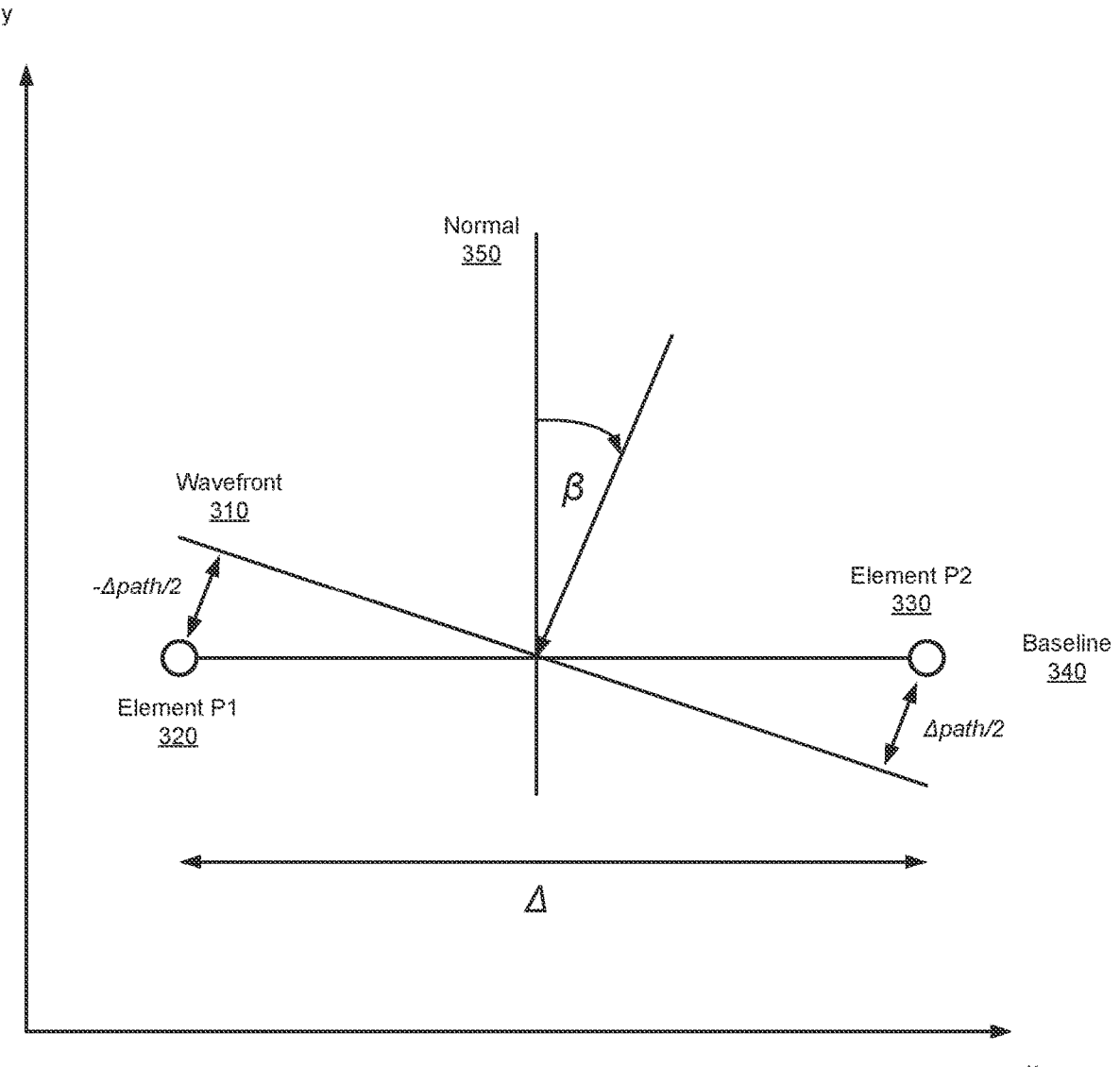
FIG. 3 illustrates a two element interferometer, configured in accordance with certain embodiments of the present disclosure.

FIG. 3 illustrates a two element interferometer 300, in 2D space, configured in accordance with certain embodiments of the present disclosure. The two element interferometer 300 is shown to include a first antenna element P1 320 and a second antenna element P2 330. The elements P1 and P2 are disposed on an interferometric baseline 340 which separates the elements by a distance $\Delta$. A wavefront 310 of the RF signal 110 is shown to arrive at an AOA of $\beta$ relative to a normal 350 to the baseline 340. A phase differential $\phi$ results from the differential path length $\Delta_{path}$ that the wavefront 310 travels to reach element P1 relative to element P2. The differential phase can be expressed as:

$$\phi = 2\pi \frac{\Delta}{\lambda} \sin\beta \qquad (1)$$

where $\lambda$ is the wavelength of the signal. For large baselines (relative to the wavelength), the differential phase can be many multiples of $2\pi$. The measured phase difference, however, is constrained to a value in the range of $\pm x$, which creates a phase wrap ambiguity. This can be expressed as $\phi_{true} = \phi_{measured} + 2\pi N_{wrap}$, where $N_{wrap}$ is not known. The disclosed techniques provide a means to efficiently aggregate measurements from multiple baselines, using a statistical model, to reduce this ambiguity.

An estimate of the bearing angle $\beta$ may expressed as:

$$\hat{\beta}(\phi_{true}) = a\sin\left(\frac{\phi_{true}}{\Delta} \frac{\lambda}{2\pi}\right) \qquad (2)$$

Or, in terms of measured phase:

$$\hat{\beta}(\phi_{measured}, N_{wrap}) = a\sin\left(\frac{\phi_{measured}}{\Delta} \frac{\lambda}{2\pi} + N_{wrap} \frac{\lambda}{\Delta}\right) \qquad (3)$$

Figure 4:
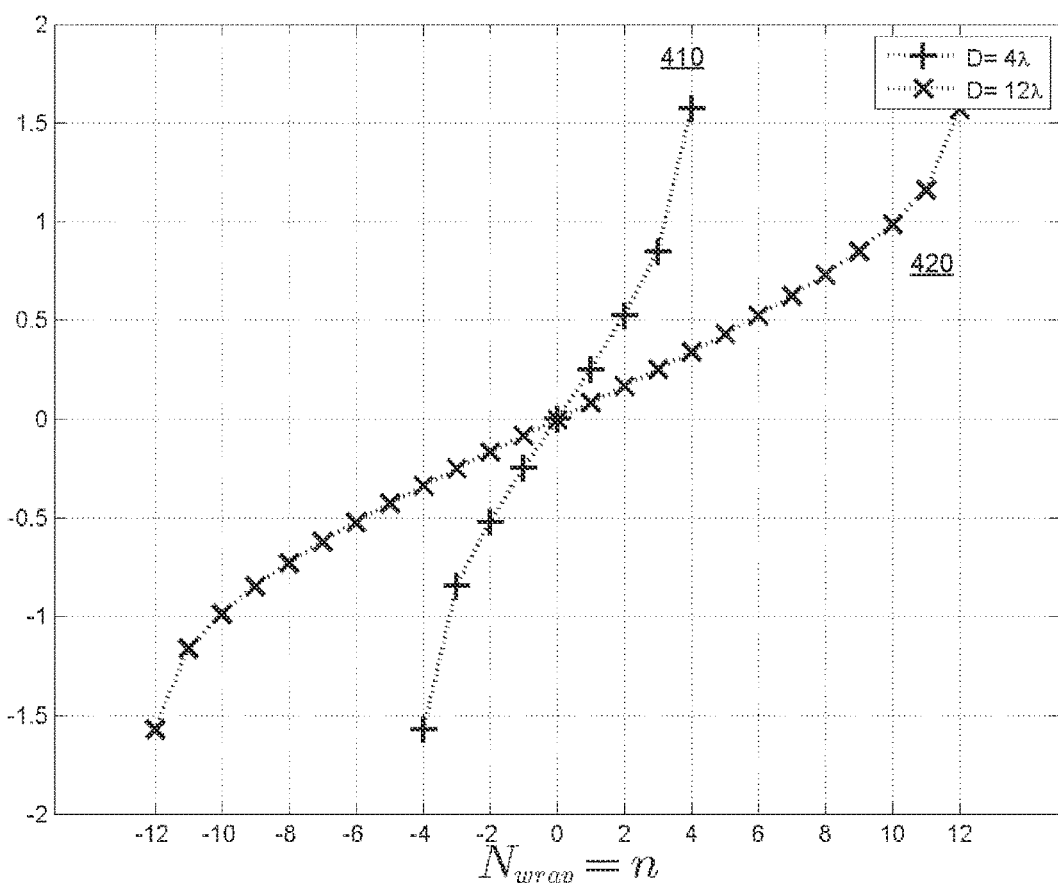
FIG. 4 illustrates phase wrap ambiguity, in accordance with certain embodiments of the present disclosure.

FIG. 4 illustrates phase wrap ambiguity 400, in accordance with certain embodiments of the present disclosure. Two plots are shown for $\hat{\beta}$ ($\phi_{measured} = 0$) as a function of $N_{wrap}$, as per equation 3. The first plot 410 is for the case where $\Delta$ equals $4\lambda$. The second plot 420 is for the case where $\Delta$ equals $12\lambda$.

Figure 5:
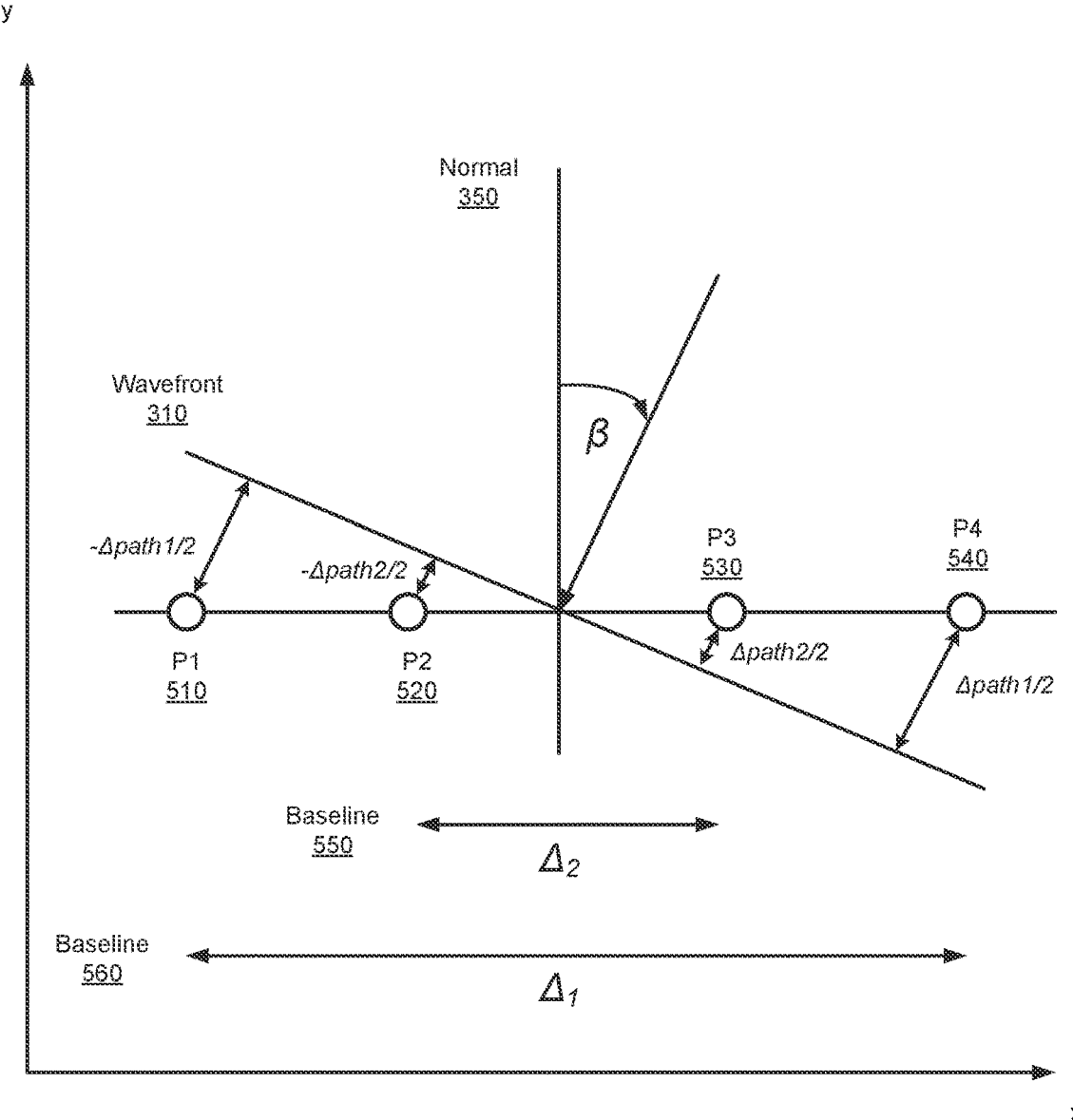
FIG. 5 illustrates a colinear four element interferometer, configured in accordance with certain embodiments of the present disclosure.

FIG. 5 illustrates a four element interferometer 500 having two colinear baselines, configured in accordance with certain embodiments of the present disclosure. The four element interferometer 500 is shown to include a first antenna element P1 510, a second antenna element P2 520, a third antenna element P3 530, and a fourth antenna element P4 520. In this example, elements P1 510 and P4 540 form a first interferometric baseline 560 having a separation of $\Delta 1$, and elements P2 520 and P3 530 form a second interferometric baseline 550, colinear with the first baseline, having a separation of $\Delta 2$. Wavefront 310 is again shown to arrive at an angle $\beta$ relative to the normal 350 to the baselines 550, 560. Phase differentials result from the differential path lengths $\Delta_{path1}$ and $\Delta_{path2}$ that the wavefront 310 travels to reach the elements of the two baselines.

Figure 6:
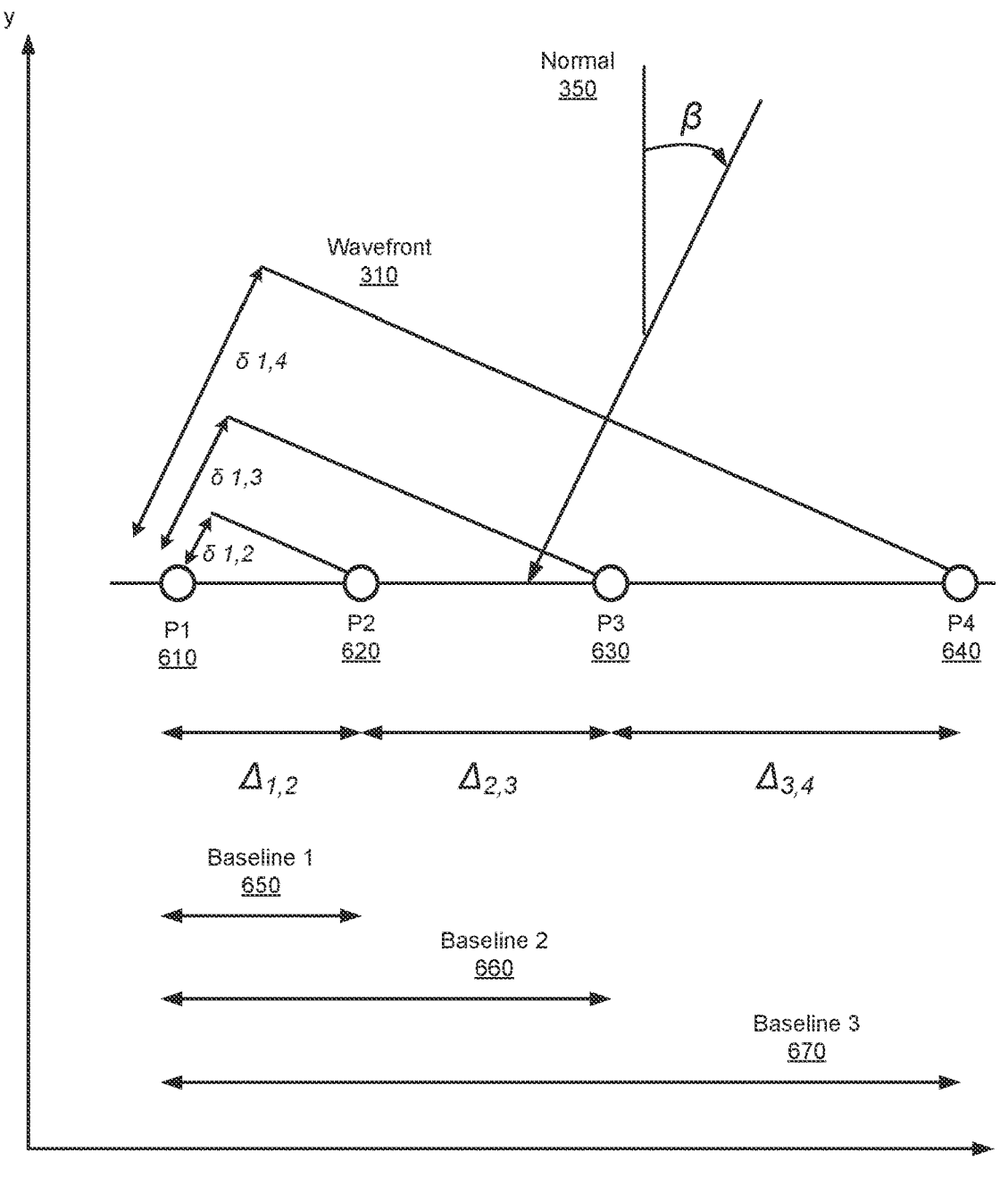
FIG. 6 illustrates a colinear interferometer array, configured in accordance with certain embodiments of the present disclosure.

FIG. 6 illustrates an interferometer array 600 having three colinear baselines, configured in accordance with certain embodiments of the present disclosure. The four element interferometer 600 is shown to include a first antenna element P1 610, a second antenna element P2 620, a third antenna element P3 630, and a fourth antenna element P4 640. In this example, the first baseline 650 comprises elements P1 610 and P2 620 having a length of $\Delta_{1,2}$, the second baseline 660 comprises elements P1 610 and P3 630 having a length of $\Delta_{1,2}+\Delta_{2,3}$, and the third baseline 670 comprises elements P1 610 and P4 640 having a length of $\Delta_{1,2}+\Delta_{2,3}+\Delta_{3,4}$. Wavefront 310 is again shown to arrive at an angle $\beta$ relative to the normal 350 to the colinear baselines 650, 660, 670. Phase differentials result from the differential path lengths $\beta_{1,2}$, $\beta_{1,3}$, and $\beta_{1,4}$ that the wavefront 310 travels to reach the elements of the three baselines.

Figure 7:
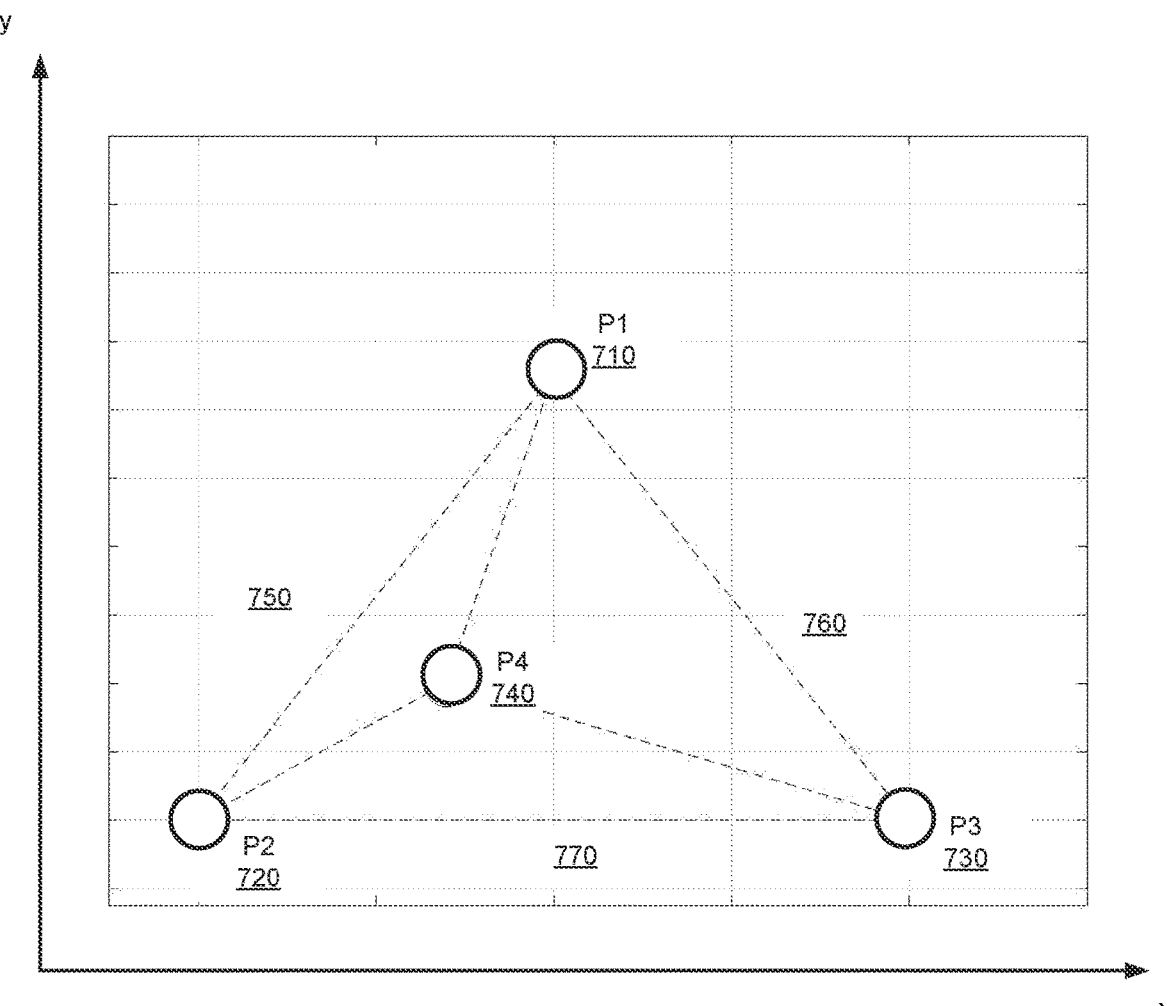
FIG. 7 illustrates a coplanar interferometer array, configured in accordance with certain embodiments of the present disclosure.

FIG. 7 illustrates a coplanar interferometer array 700, configured in accordance with certain embodiments of the present disclosure. This example illustrates that the antenna elements P1 710, P2 720, P3 730, and P4 740, can be arranged in a non-colinear configuration in a 2D plane. Baselines can be formed between any of the pairs of antenna elements such as, for example, baselines 750, 760, and 770.

The disclosed techniques may be applied to data collected from various combinations of interferometric baselines (including the examples illustrated above as well as other examples, including 3D configurations, to be described below). The techniques provide a means to efficiently aggregate measurements from the multiple baselines, using a statistical model, to reduce this ambiguity. In some embodiments, the statistical model is generated to relate the actual phase $\phi_{true}$ to the a-posterior probability of the angular position $\beta$ of object based on measured phase $\phi_{measured}$.

It can be shown that $$P(\beta \mid \phi_{measured}) = \sum_n P(\beta, N_{wrap} = n \mid \phi_{measured}) \tag{4}$$

$$= \sum_n P(\beta \mid \phi_{measured}, N_{wrap} = n)P(N_{wrap} = n) \tag{5}$$

Conditioned on a particular wrap value $N_{wrap}$, each of the n conditional $P(\beta \mid \phi_{measured}, N_{wrap}=n)$ terms within the summation of equation 5 is a localized probability lobe centered at $$\hat{\beta}(\phi_{measured}, N_{wrap} = n) = a\sin\left(\frac{\phi_{measured}}{\Delta}\frac{\lambda}{2\pi} + n\frac{\lambda}{\Delta}\right) \tag{6}$$

These probability lobes are modeled as Gaussian distributions of a random variable x with mean $\mu$ and variance $\sigma_\beta$, $G(x;\mu,\sigma_\beta)$, where $$G(x; \mu, \sigma) = \frac{1}{\sqrt{2\pi\sigma^2}} \exp\left(\frac{-(x-\mu)^2}{2\sigma^2}\right) \tag{7}$$

having $$\mu_n(\phi_{measured}, \Delta) = \hat{\beta}(\phi_{measured}, N_{wrap} = n, \Delta) \tag{8}$$

and local variance $$\sigma_\beta = \frac{\lambda}{\Delta}\frac{1}{\kappa 2\pi\sqrt{SNR}} \tag{9}$$

where $\kappa$ is a configuration or system specific scale factor within the range of one to two that depends on factors such as the number of path lengths (e.g., one or two) associated with the reception of signal energy. It follows that the $n^{th}$ lobe term of equation 5

$$P(\beta \mid \phi_{measured}, N_{wrap} = n) \sim C_o G(\beta; \mu_n(\phi_{measured}, \Delta), \sigma_\beta) \tag{10}$$

which includes conditioning on the ambiguity wrap number which is included in the $\mu_n$ term and $C_o$ is a normalizing constant.

Integrating out the discrete uniformly distributed $P(N_{wrap})$ random variable recasts equation 5 as $$P(\beta \mid \phi_{measured}) = C_o \sum_n G(\beta; \mu_n, \sigma_\beta) \tag{11}$$

As an example, for a colinear interferometer having two baselines, as illustrated in FIG. 3, the a-posterior probability of object angle $\beta$ given two distinct baselines and their respective phase measurements can be expressed as $$P(\beta \mid \phi(1), \phi(2); \Delta(1), \Delta(2)) = \left(\sum_m G(\beta; \mu_m(\phi_{measured}(1), \Delta(1)), \sigma_m)\right) \tag{12}$$

$$\left(\sum_n G(\beta; \mu_n(\phi_{measured}(2), \Delta(2)), \sigma_n)\right)$$

Similarly, extending for a colinear interferometer having three baselines, as illustrated in FIGS. 5 and 6, $$P(\beta \mid \phi(1), \phi(2), \phi(3); \Delta(1), \Delta(2), \Delta(3)) = \tag{13}$$

$$\prod_{b=1}^{3}\left(\sum_m^{M_b} G(\beta; \mu_m(\phi_{measured}(b), \Delta(b)), \sigma_m(b))\right)$$

Figure 8:
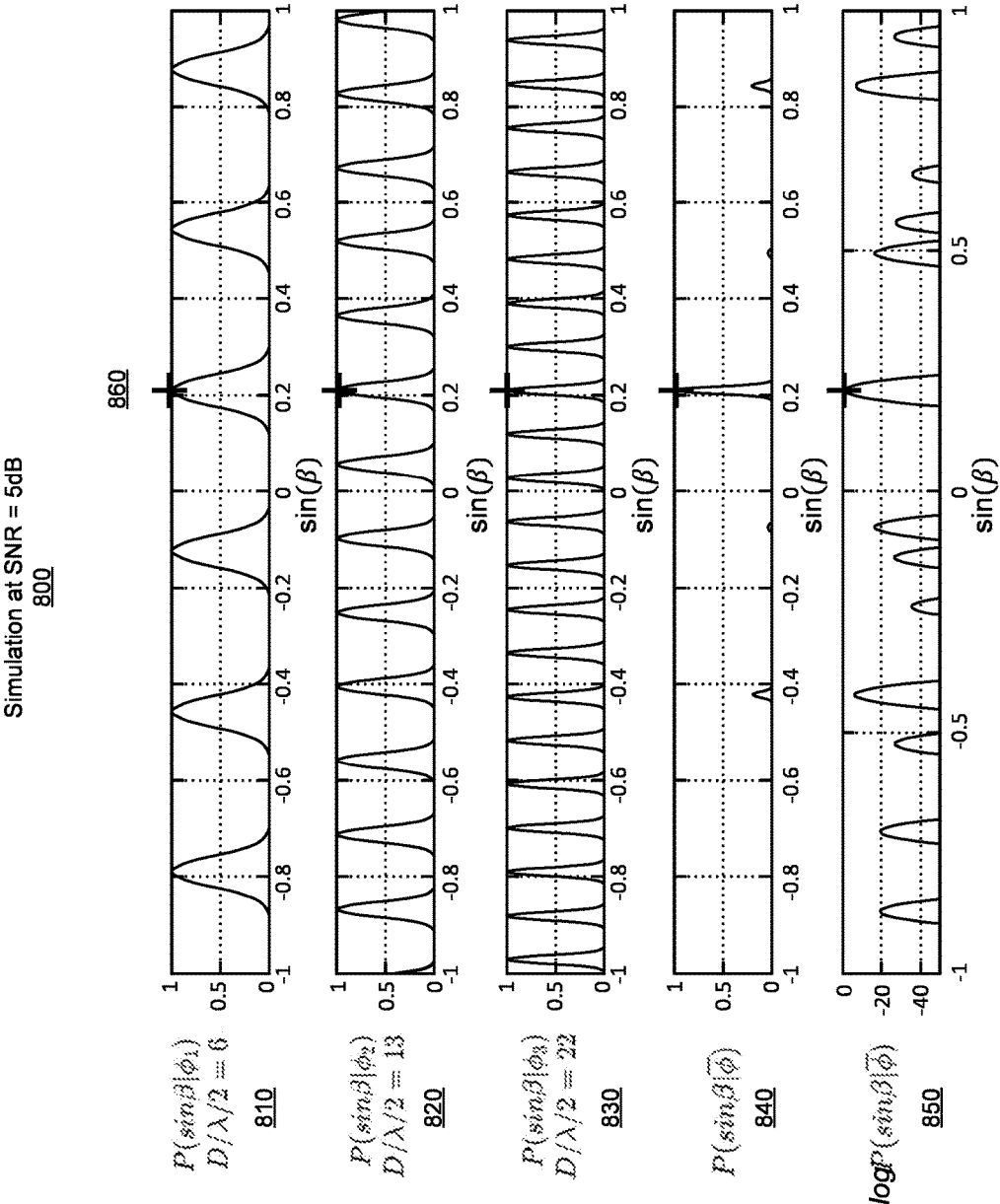
FIG. 8 illustrates probability lobes associated with a simulation at a first signal to noise ratio (SNR), in accordance with certain embodiments of the present disclosure.

The advantages of aggregating information from multiple baselines can be explained, for example, with reference to the four element colinear interferometric array of FIG. 6. For this example, the inter-element spacing is set to $\Delta_{1,2}=6\lambda/2$, $\Delta_{2,3}=7\lambda/2$, and $\Delta_{3,4}=9\lambda/2$ resulting in cumulative baselines of length $6\lambda/2$, $13\lambda/2$, and $22\lambda/2$ respectively. FIG. 8 illustrates simulation results 800 for this scenario, which show probability lobes that result for the simulation performed at an SNR of 5 dB. The top three rows 810, 820, and 830 depict the baseline conditional probabilities (lobes), $P(B|\phi_{measured}$ (b)), for each of the baselines 650, 660, and 670 respectively. The plots are shown as a function of sin (B) rather than $\beta$ to linearize the graph and improve clarity. The cross markers 860 indicate the true $\beta$ of the simulation, while the other lobes are associated with the phase wrap ambiguities. The fourth row 840 shows the aggregation (e.g., multiplicative product) of the probability lobes of the three baselines. As can be seen, the ambiguous $\beta$s tend to cancel out because they do not line up (since the baseline lengths are not integer multiples of one another), while the true $\beta$ remains. The fifth row 850 shows the aggregation on a log scale.

Figure 9:
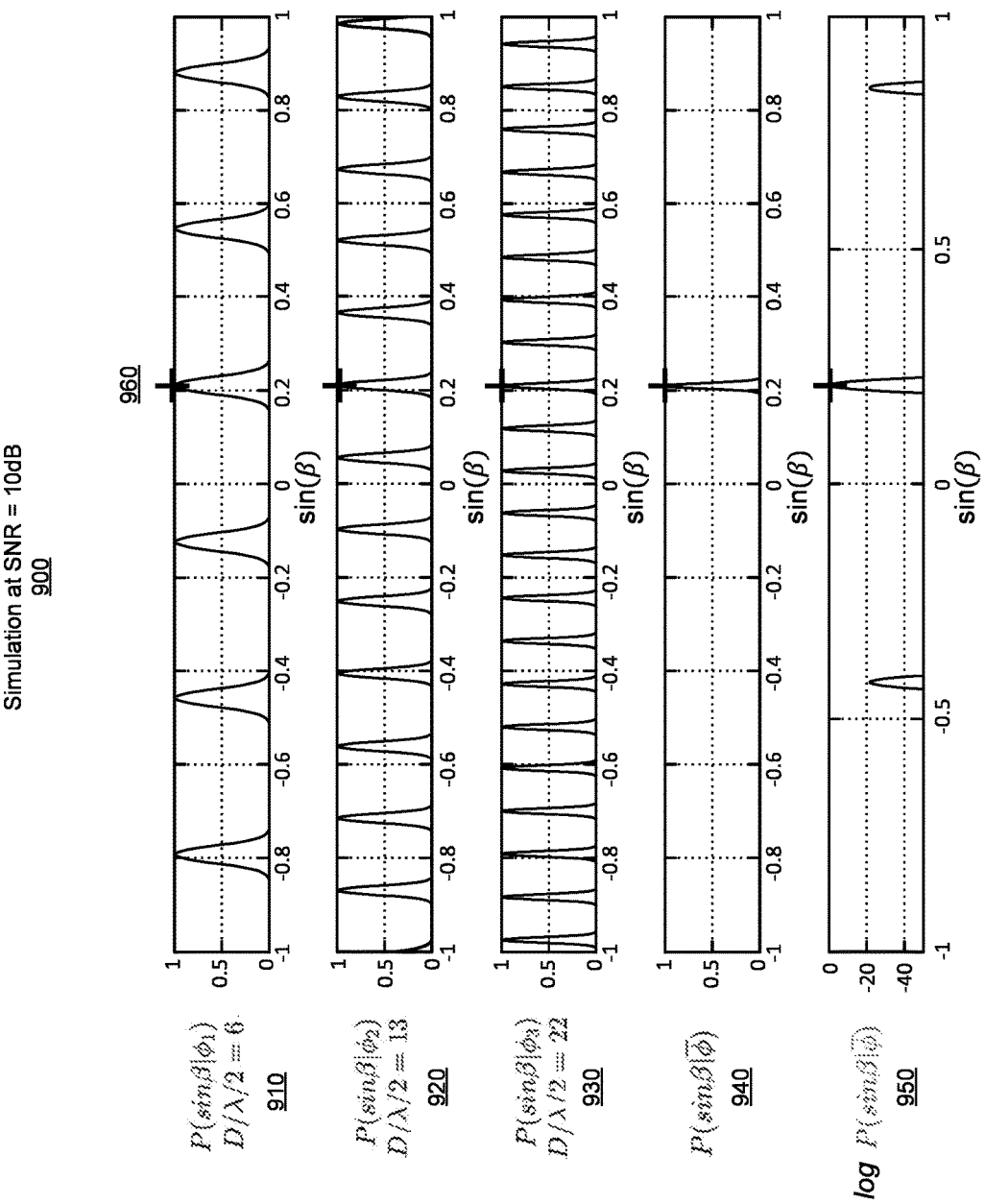
FIG. 9 illustrates probability lobes associated with a simulation at a second SNR, in accordance with certain embodiments of the present disclosure.

For comparison, FIG. 9 illustrates the probability lobes associated with a second simulation 900 performed at an SNR of 10 dB, in accordance with certain embodiments of the present disclosure. As in FIG. 8, the top three rows 910, 920, and 930 depict the baseline conditional probabilities for each of the baselines, the fourth row 940 shows the aggregation, the fifth row 950 shows the aggregation on a log scale, and the cross markers 960 indicate the truth value. As can be seen in the comparison of FIGS. 8 and 9, increased SNR sharpens the lobe widths, which decreases lobe overlap between baselines and reduces the ambiguity.

Figure 10:
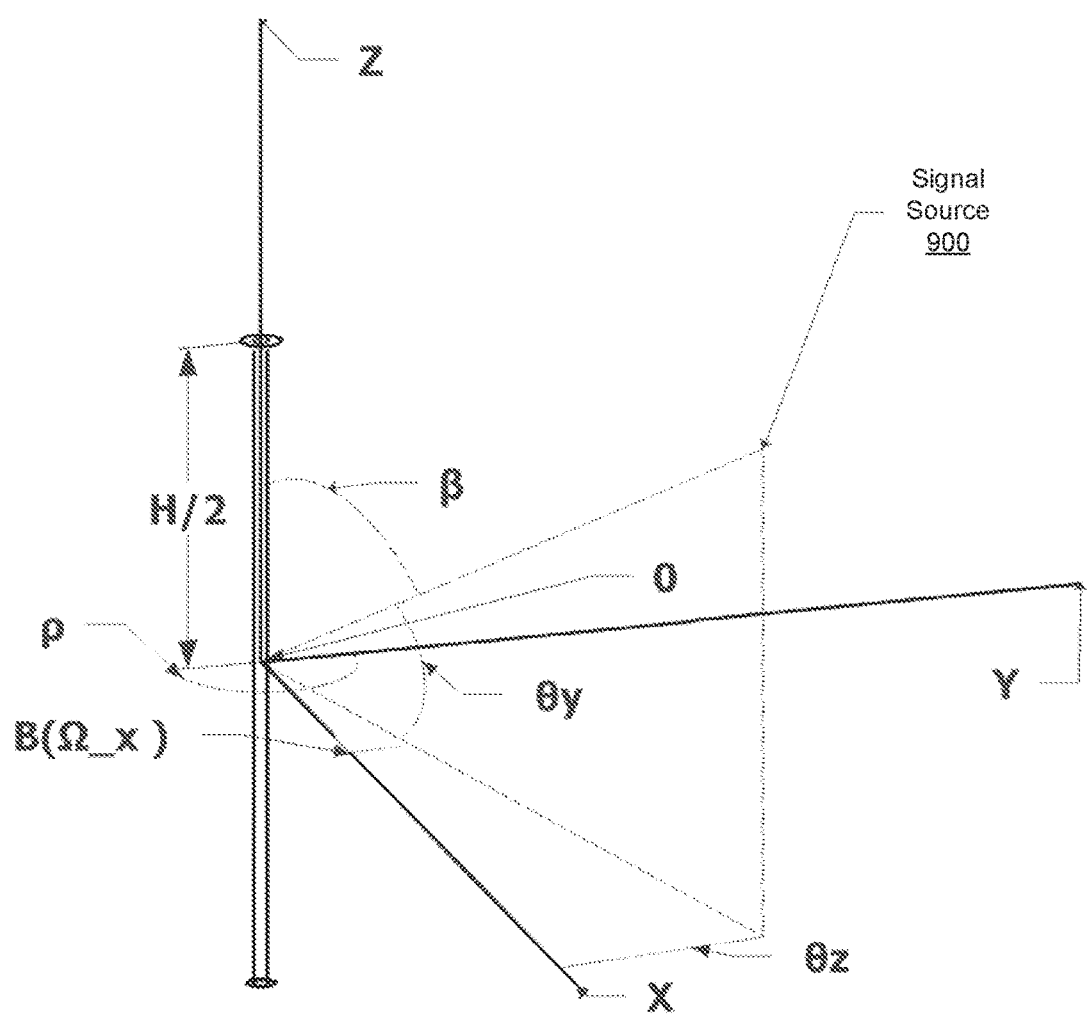
FIG. 10 illustrates an oblique view of a two dimensional (2D) or three dimensional (3D) generalization of a two element interferometer, configured in accordance with certain embodiments of the present disclosure.

The disclosed techniques for computationally efficient aggregation of information provided from multiple interferometric baselines can be extended to three dimensions. FIG. 10 illustrates an oblique view of a 2D or 3D generalization of a two element interferometer 1000, configured in accordance with certain embodiments of the present disclosure. The interferometric baseline is comprised of two apertures at baseline separations $\Delta=H$. The interferometric axis is set parallel to (and in this case coincident with) the z axis, while the object 900 is located at a point [X, Y, Z] in Cartesian coordinate space, where:

$$X=R\cos(\theta_y)\sin(\theta_z), Y=R\cos(\theta_y)\sin(\theta_y), Z=R\cos(\theta_y)\sin(\theta_z),$$

with respective angular offsets $\theta_y$ (azimuth) and $\theta_z$ (elevation).

Because the interferometric baseline aligns with the z axis, the vertical angle component $\theta_z$ coincides with the arrival (conical) angle $\beta$ (the angle between the object vector and the boresight of the interferometric baseline). The single baseline measurement provides no information about the rotation angle $\rho$, which in the case of a vertically aligned interferometer maps to the azimuth angle direction $\theta_z$.

In the more general case involving interferometric baselines residing on the YZ plane, the notation is extended to emphasize that the interferometric baseline will not necessarily align with a leg of the common frame of reference (FOR), and thus the local conical angle $\beta$ cannot be assumed to align with either component ($\theta_y$ or $\theta_z$) of the 2D angular position.

Figure 11:
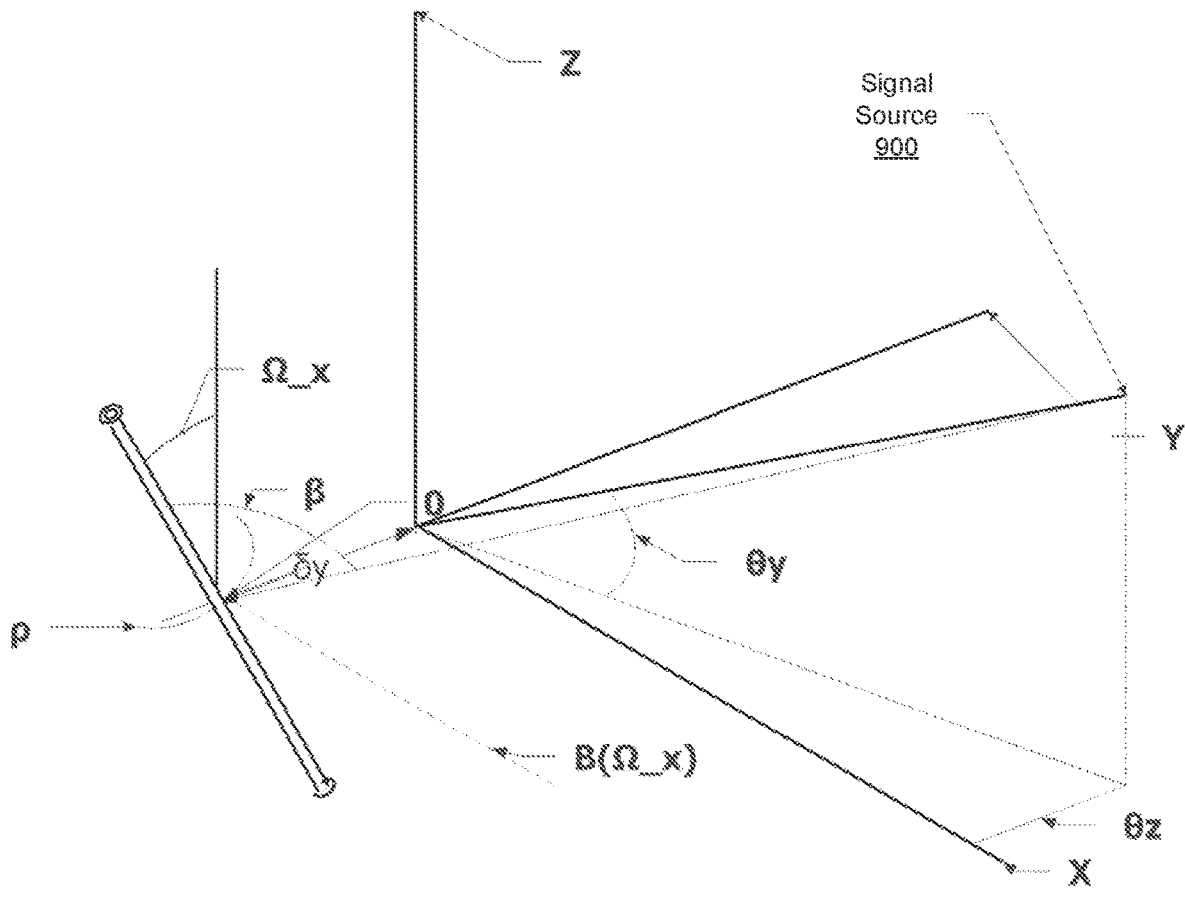
FIG. 11 illustrates an oblique view of a 3D generalization of a canted two element interferometer, configured in accordance with certain embodiments of the present disclosure.

FIG. 11 illustrates an oblique view of a 3D generalization of a canted two element interferometer 1100, configured in accordance with certain embodiments of the present disclosure. This is the same interferometric baseline with cant angle $\Omega_x$ (about the x axis), relative to the z axis) applied such that the baseline still resides within the YZ plane and the midpoint resides at $[0,-\delta_y, 0]$ within the XYZ FOR. The object 900 again resides at Cartesian point $$[X=R\cos(\theta_y)\sin(\theta_2), Y=R\cos(\theta_y)\sin(\theta_y), Z=R\cos(\theta_y)\sin(\theta_z)],$$

with respective angular offsets $\theta_z$ (azimuth) and $\theta_y$ (elevation) relative to the XYZ FOR. The conical angle $\beta$, between the target vector and the interferometric baseline boresight, can be expressed as $$\beta = a\cos\left(\frac{\vec{U}_{target}\vec{B}(\Omega)}{|\vec{U}_{target}||\vec{B}(\Omega)|}\right) \tag{14}$$

where $$\Omega = [\Omega_x, \Omega_y]. \tag{15}$$

Figure 12:
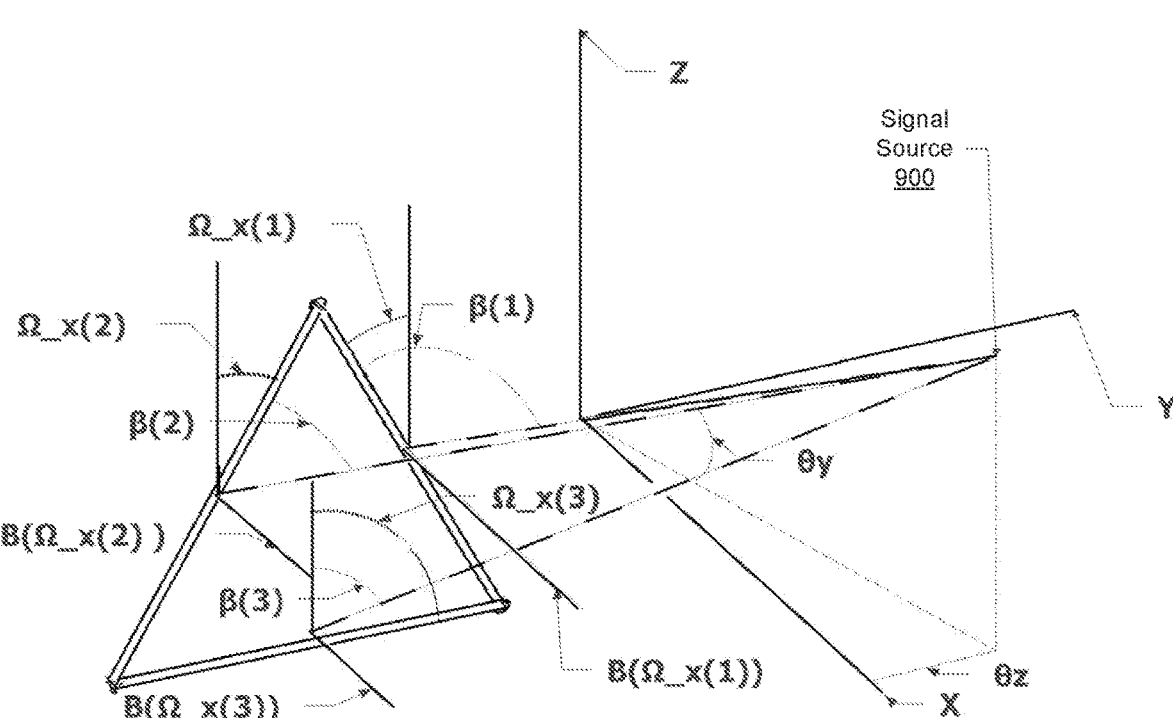
FIG. 12 illustrates an oblique view of a 3D generalization of a canted three element interferometer, configured in accordance with certain embodiments of the present disclosure.

FIG. 12 illustrates an oblique view of a 3D generalization of a canted three element interferometer 1200, configured in accordance with certain embodiments of the present disclosure. With $\Omega_y=0$, in the cases of FIGS. 10, 11 and 12, the vectors corresponding to the baseline boresight and line of sight to the target are $\vec{B}(\Omega)$ and $\vec{U}_{target}$ respectively. The vector dot product expression for conical angle $\beta$ is exact for all target geometries and baseline rotations $\Omega$. In the coplanar case a simplification of this relation provides a useful interpretation. The angular position of the target object can be expressed as $\partial_{yz}=[\theta_y\ \theta_z]_{target}$ (w.r.t. the XYZ FOR) and, assuming that the interferometric baseline lies on the YZ plane, a rotation matrix T can be applied to map the object angular position $\partial_{yz}$ in the YZ FOR to the local interferometric estimates $\partial_{\beta\rho}$ in the FOR of the baseline.

$$\partial_{\beta\rho} = T(\Omega_x)\ \partial_{yz}. \tag{16}$$

Equation 16 is a forward model that maps an object direction (parameterized by $\partial_{yz}$) onto the baseline, and can be expanded as:

$$\underbrace{\begin{bmatrix} \sin\beta \\ \sin\rho \end{bmatrix}}_{\partial_{\beta\rho}} = \underbrace{\begin{bmatrix} \cos\Omega_x & \sin\Omega_x \\ -\sin\Omega_x & \cos\Omega_x \end{bmatrix}}_{T(\Omega_x)} \underbrace{\begin{bmatrix} \sin\theta_y \\ \sin\theta_z \end{bmatrix}}_{\partial_{yz}} \tag{17}$$

A corresponding backward model can be expressed as:

$$\partial_{yz} = R(\Omega_x)\partial_{\beta\rho} \tag{18}$$

where $R(\Omega_x)=T(\Omega_x)^{-1}$ is the inverse of equation 17. The sin ( ) operator is applied to the angles to define direction vector components that can be transformed from one FOR to another via a rotation matrix. Since the raw baseline-centric measurements develop angular estimates in the baseline FOR($\beta$, $\rho$, equation 18 reflects a relationship in the aggregation of multiple, individual baselines onto the common YZ FOR.

The components of the baseline measurement $\partial_{\beta\rho}=[\sin\rho, \sin\beta]$ relate to the rotation and conical angle of the baseline under consideration. $\theta_{\beta\rho}$ can also be viewed as the angular position of the object in the baseline FOR, assuming that for a single baseline interferometric phase measurement, information accrues only to the conical angle $\beta$, not to the rotation angle $\rho$. Equation 18 can be rearranged to show a linear (y=mx+b, slope and offset) relationship between $\theta_y$ and $\theta_z$ representing ridges of probability in 2D, parameterized on conical angle $\beta$:

$$\sin\theta_y(\sin\theta_z; \sin\beta, \Omega_x) = (\sin\beta - \sin\Omega_x\sin\theta_z)/(\cos\Omega_x) \qquad (19)$$

$$\sin\theta_y(\sin\theta_z; \sin\beta, \Omega_x) = -(\tan\Omega_x)\sin\theta_z + \sin\beta/\cos\Omega_x \qquad (20)$$

that is independent of the rotation angle $\rho$. Restated, a sweep of values of $\partial_{yz} = [\sin\theta_y(\theta_z; \Omega_x), \sin\theta_z]$ results in a range of $\rho$ values at the same conical angle $\beta$. This result is the mathematical equivalent of the physical interpretation of a single interferometric baseline measurement: a conical angle $\beta$ with an arbitrary rotation angle $\rho$.

Figure 13:
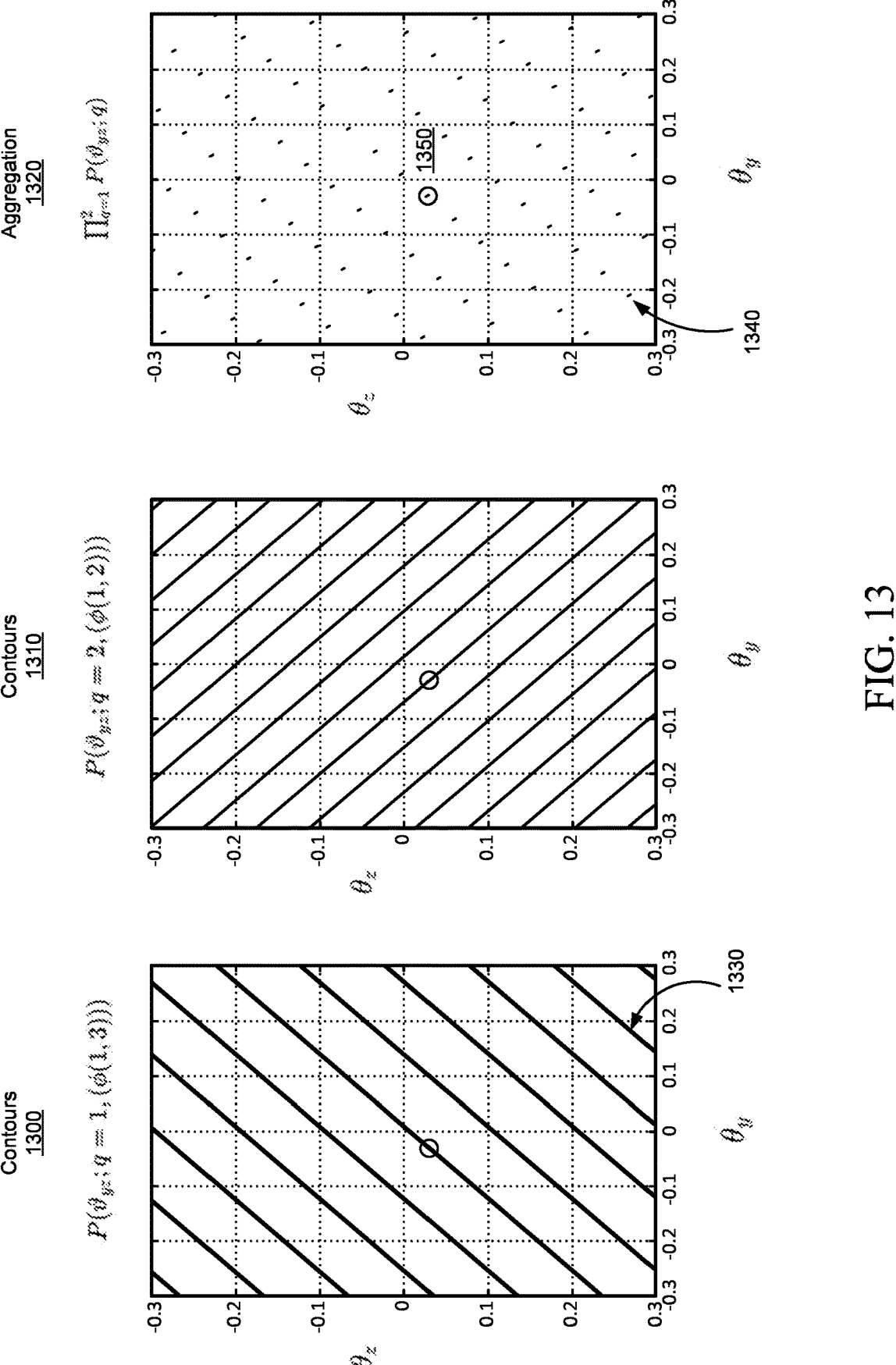
FIG. 13 illustrates baseline phase measurement contours for two baselines along with the aggregated cumulative product, in accordance with certain embodiments of the present disclosure.

FIG. 13 illustrates baseline phase measurement contours for two baselines along with the aggregated cumulative product, in accordance with certain embodiments of the present disclosure. The data for this figure is based on a simulation using baselines of the coplanar interferometer of FIG. 7. FIG. 13 depicts $\theta_y(\theta_z; \beta, \Omega_x)$, the single baseline phase measurement relation of equation 20, as contours 1300 and 1310 parameterized by conical angle $\beta$ for two different baseline rotations $$\Omega_x = \left[\frac{\pi}{6}, -\frac{\pi}{12}\right],$$

respectively. It is noted that this notation suppresses the actual dependency $\theta_y(\theta_z; \beta, \Omega_x) = \arcsin(\sin\theta_y(\sin\theta_z; \sin\beta, \Omega_x))$. It is also noted that the relation of equation 20 and a single interferometric phase measurement $\phi(q)$ does not fix a single "truth" pair $[\theta_y, \theta_z]$, (e.g., the truth pair of the simulation is at location 1350). Rather, the linear relation of equation 20 depicts the $\beta$ contours 1330 of FIG. 13 which illustrates this linear relationship $(\theta_y(\theta_z; \beta, \Omega_x))$ across a set of contour lines with different values of conical angles $\beta$. Also depicted, is the distinct effect of the lobe-wise ambiguity (referenced to the $\beta$, $\rho$ baseline FOR), which results in the set of ridge lines 1330 that are periodic in $\beta$ and quasi periodic in $\theta$ due to the ~a sin( ) characteristic of equation 2 (as depicted in FIG. 4). Restating, the probability conditioned on any single baseline is a 1D $P(\beta)$ grid similar to those depicted in FIG. 8. When recast in a new $[\theta_y, \theta_z]$ FOR (that anticipates multiple baseline aggregation), these 1D ambiguities are now the 2D ridge lines 1330 of FIG. 13. The aggregation 1320 is also shown, as the product of the contours 1300 and 1310, which reduces the ambiguity search space to a set of potential locations 1340 in a grid pattern, one of which, 1350, is the true location of the simulation.

Figure 14:
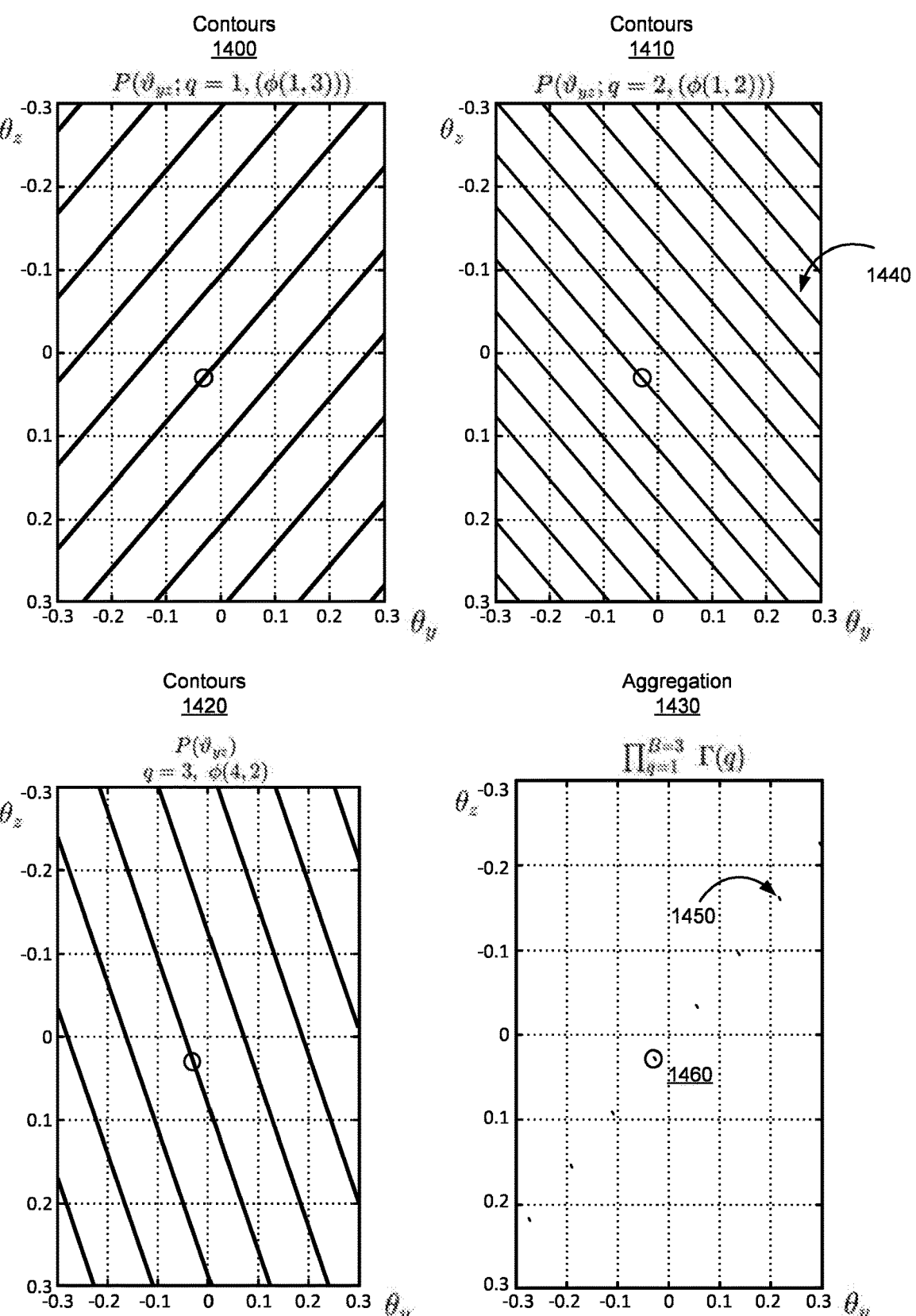
FIG. 14 illustrates baseline phase measurement contours for three baselines along with the aggregated cumulative product, in accordance with certain embodiments of the present disclosure.

FIG. 14 illustrates baseline phase measurement contours for three baselines along with the aggregated cumulative product, in accordance with certain embodiments of the present disclosure. In this example, contours 1400, 1410, and 1420 (having ridgelines 1440) are associated with pairs of three of the baselines of the coplanar interferometer of FIG. 7. As can be seen, the aggregation 1430 of three baselines further reduces the ambiguity search space to potential locations 1450, compared to the two baseline case described above. The true location 1460 of the simulation is also shown. The process can be extended to use a greater number of baselines to further reduce the ambiguity.

Returning now to FIG. 2, operation of the angle ambiguity mitigation system 140 can be described in greater detail. For an interferometer comprising B baselines, the process iterates through baselines b=1 . . . . B.

The phase measurement circuit 200 is configured to measure the phase difference $\phi(b)$ between the antenna elements of baseline b.

The AOA conditional probability calculator 210 is configured to calculate $P(\beta|\phi(b))$, the conditional probability of the local conical angle of arrival $\beta$ given the measured differential phase of the $b^{th}$ baseline. In some embodiments, the process includes calculating the lobewise mean $\mu_n(\phi_{measured}(b), \Delta), \sigma_\beta)$ for each $N_{wrap}$=n (from equation 6) as:

$$\mu_n = a\sin\left(\frac{\phi_{measured}}{\Delta}\frac{\lambda}{2\pi} + n\frac{\lambda}{\Delta}\right)$$

The lobewise variance $\sigma_\beta$ is then calculated (from equation 9) as:

$$\sigma_\beta = \frac{\lambda}{\Delta}\frac{1}{\kappa}\frac{1}{2\pi\sqrt{SNR}}$$

The a-posterior probability for the $n^{th}$ lobe is then calculated (from equations 7 and 11) as:

$$P(\beta|\phi_{measured}) = C_o\sum_n G(\beta; \mu_n, \sigma_\beta)$$

where $$G(x; \mu, \sigma) = \frac{1}{\sqrt{2\pi\sigma^2}}\exp\left(\frac{-(x-\mu)^2}{2\sigma^2}\right)$$

The angular position probability calculator 220 is configured to calculate the angular position probability of the object in the baseline $\beta\rho$ FOR into a target $\partial_{yz}$ FOR, where $\rho$ is the rotation angle. In some embodiments, the process includes applying a rotation matrix $R(\Omega_x(b))=T(\Omega_x(b))^{-1}$, with cant angle $\Omega_x(b)$ of the $b^{th}$ interferometric baseline (from equation 17):

$$\underbrace{\begin{bmatrix}\sin\beta \\ \sin\rho\end{bmatrix}}_{\partial_{\beta\rho}} = \underbrace{\begin{bmatrix}\cos\Omega_x & \sin\Omega_x \\ -\sin\Omega_x & \cos\Omega_x\end{bmatrix}}_{T(\Omega_x)}\underbrace{\begin{bmatrix}\sin\theta_y \\ \sin\theta_z\end{bmatrix}}_{\partial_{yz}}$$

To calculate the $n^{th}$ lobewise probability (conditioned on ambiguity wrap) $P(\partial_{yz}; v_n(b), \Lambda_{yz}(b))$ in the common YZ FOR with mean:

$$v_n(b) = R[\eta\,\mu_n(b)]' \qquad (21)$$

and covariance:

$$\Lambda_{yz}(b) = R\,\Lambda_{\beta\rho}(b)\,R^T \qquad (22)$$

The parameters that define the $n^{th}$ lobe of the $b^{th}$ baseline probability $P(\partial_{yz}; v_n(b), \Lambda_{yz}(b))$ for this iteration are stored.

The recursive baseline aggregation calculator 230 is configured to perform a recursive aggregation of the baseline conditioned probabilities. For example, the recursion $\Gamma(b)$ can be represented as:

$$\Gamma(b) = \Gamma(b-1)\left(\sum_{m=0}^{M_b} G(m)\right) \qquad (22)$$

where $M_b$ is the number of supportable lobes associated with the $b^{th}$ baseline iteration. In some embodiments, the recursion process can be expressed as:

For $b=1$, $\Gamma(b=1)$ is filled with the lobewise parameters of $P(\partial_{yz}; v_m(1), \Lambda_{yz}(1))$ of the first baseline:

$$\Gamma(1) = \sum_{m}^{M_b} G\underbrace{(\vartheta_{yz}; v_m(q), \Lambda_\varphi(q))}_{G_m(q=1)} \qquad (23)$$

For $b=2 \ldots . B$, the lobewise product is calculated as:

$$\Gamma(b) = \Gamma(b-1) \times P(\vartheta_{yz}; v_m(b), \Lambda_{yz}(b)) \qquad (24)$$

In some embodiments, the recursion results may be culled, for example based on a thresholding of amplitudes of the aggregated probability lobes, to eliminate lower probabilities. A re-indexing may be performed (e.g., as $\Gamma(b) \Rightarrow \Gamma_{index}(b)$) to reflect the elimination of culled results.

The process then iterates back through iteration circuit 240 to select the next baseline of the interferometer so that circuit 200 provides new phase measurements to continue the process. The iteration continues until all desired baselines have been processed as described above.

After the final recursion is performed, the probability lobes 235 (e.g., the final product $\Gamma(B)$) are provided to the likelihood sorting circuit 250. $\Gamma(B)$ can be expressed as:

$$\Gamma(B) = P(\vartheta_{yz} \mid \bar{\phi}; \bar{\Omega}_x) = C_o \sum_{m'} \alpha_{m'} G(\vartheta_{yz}; v_{m'}(B), \Lambda_{m'}(B)) \qquad (25)$$

where the notation $\alpha_m$, $v_m$, $\Lambda_m$, emphasizes that each lobe of the final index set m' has a particular set of bivariate gaussian parameters that result from the sequential products rather than any particular baseline. The lobewise amplitude parameter am of equation 25 provides a convenient means to consider bearing ambiguity according to local conditional probability. The aggregations 1320 and 1430 (of FIGS. 13 and 14 respectively) depict the final lobe amplitudes $\alpha_{m'}$.

The likelihood sorting circuit 250 is configured to sort the lobes, for example in a descending order according to $\alpha_{m'}$. After sorting, the index m'=1 is associated with the most likely lobe with max value at $\partial_{yz} = v_{m'=1} = [\sin\theta_y, \sin\theta_z]$ and covariance $\Lambda_{m'}$. The disambiguated angle $\partial_{yz}$ 260 is selected and provided based on the index m'=1.

Methodology

Figure 15:
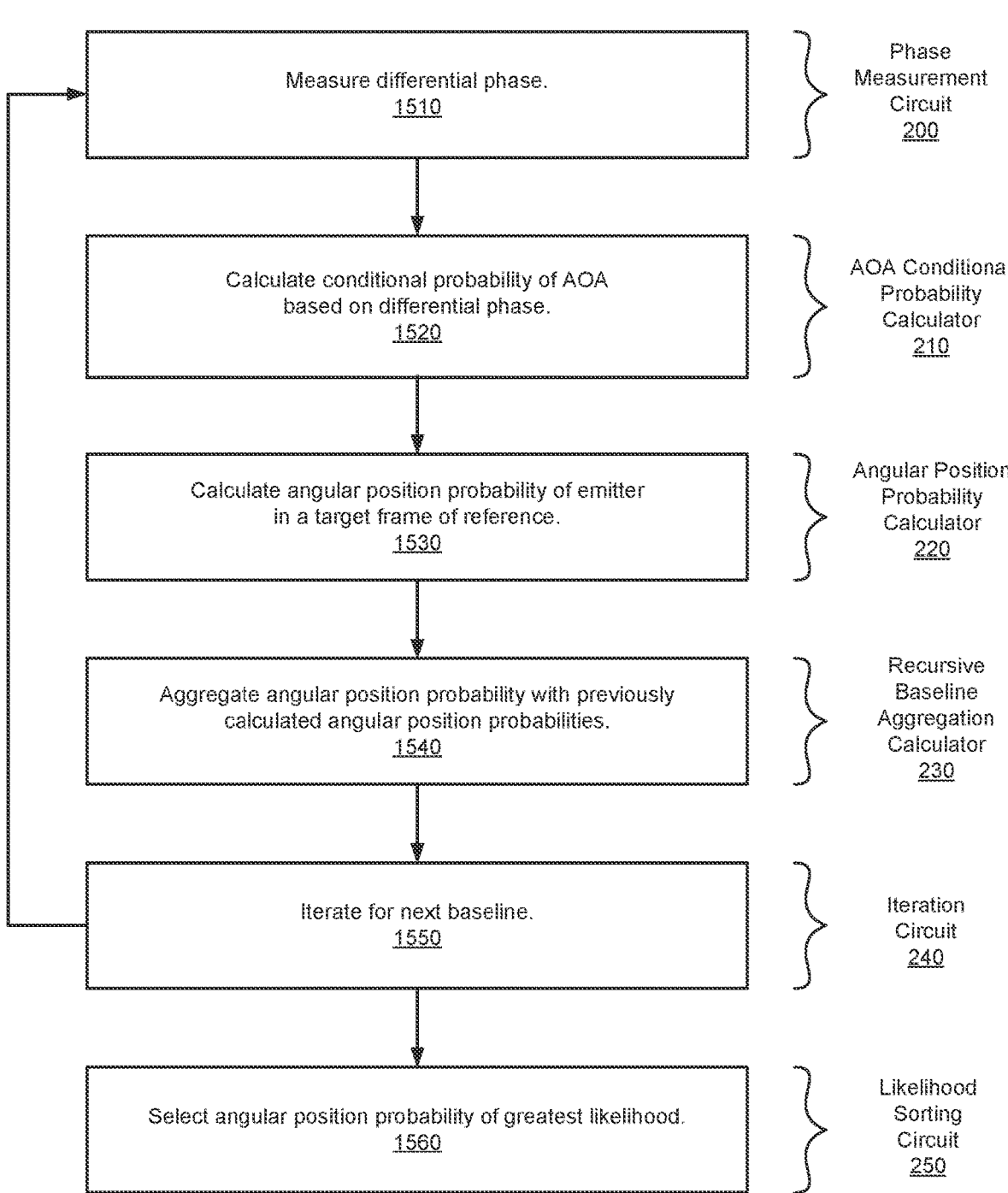
FIG. 15 is a flowchart illustrating a methodology for interferometry based angle ambiguity mitigation, in accordance with an embodiment of the present disclosure.

FIG. 15 is a flowchart illustrating a methodology 1500 for interferometry based angle ambiguity mitigation, in accordance with an embodiment of the present disclosure. As can be seen, example method 1500 includes a number of phases and sub-processes, the sequence of which may vary from one embodiment to another. However, when considered in aggregate, these phases and sub-processes form a process for angle ambiguity mitigation, in accordance with certain of the embodiments disclosed herein, for example as illustrated in FIG. 2, as described above. However other system architectures can be used in other embodiments, as will be apparent in light of this disclosure. To this end, the correlation of the various functions shown in FIG. 15 to the specific components illustrated in the figures, is not intended to imply any structural and/or use limitations. Rather other embodiments may include, for example, varying degrees of integration wherein multiple functionalities are effectively performed by one system. Numerous variations and alternative configurations will be apparent in light of this disclosure.

In one embodiment, method 1500 commences, at operation 1510, by measuring a differential phase of a signal received at antenna elements of a currently selected baseline of a plurality of baselines of an interferometer.

At operation 1520, a conditional probability of an angle of arrival (AOA) of the signal is calculated, based on the measured differential phase. The conditional probability is modelled as a Gaussian distribution. In some embodiments, a mean of the Gaussian distribution is calculated for each of a set of phase wrap ambiguities of the measured differential phase, and a variance of the Gaussian distribution is calculated based on a signal to noise ratio of the received signal. The conditional probability may then be calculated as a sum of the Gaussian distributions associated with of the phase wrap ambiguities.

At operation 1530, an angular position probability of an object in a target frame of reference is calculated based on the conditional probability of the AOA. In some embodiments, the angular position probability is calculated by applying a rotation matrix to the conditional probability. The rotation matrix is generated based on a cant angle of the currently selected baseline.

At operation 1540, the angular position probability is aggregated with previously calculated angular position probabilities to generate a current angular position probability. The previously calculated angular position probabilities are based on previously selected baselines of the plurality of baselines. In some embodiments, the aggregation is performed as a recursive multiplicative product of the angular position probabilities.

At operation 1550, a next baseline, of the plurality of baselines, is selected as the currently selected baseline and the process is iterated, starting back at operation 1510, to calculate a next angular position probability based on the selected next baseline At operation 1560, an angular position probability of greatest likelihood is selected from the current and the previously calculated angular position probabilities, based on an amplitude of the Gaussian distributions. The selected angular position probability is associated with a disambiguated angular position of the object.

In some embodiments, additional operations may be performed, as previously described in connection with the system. For example, the angular position probabilities may be culled or filtered down based on a comparison of amplitudes of the Gaussian distributions to as threshold value, to eliminate lower probability solutions.

Example System

Figure 16:
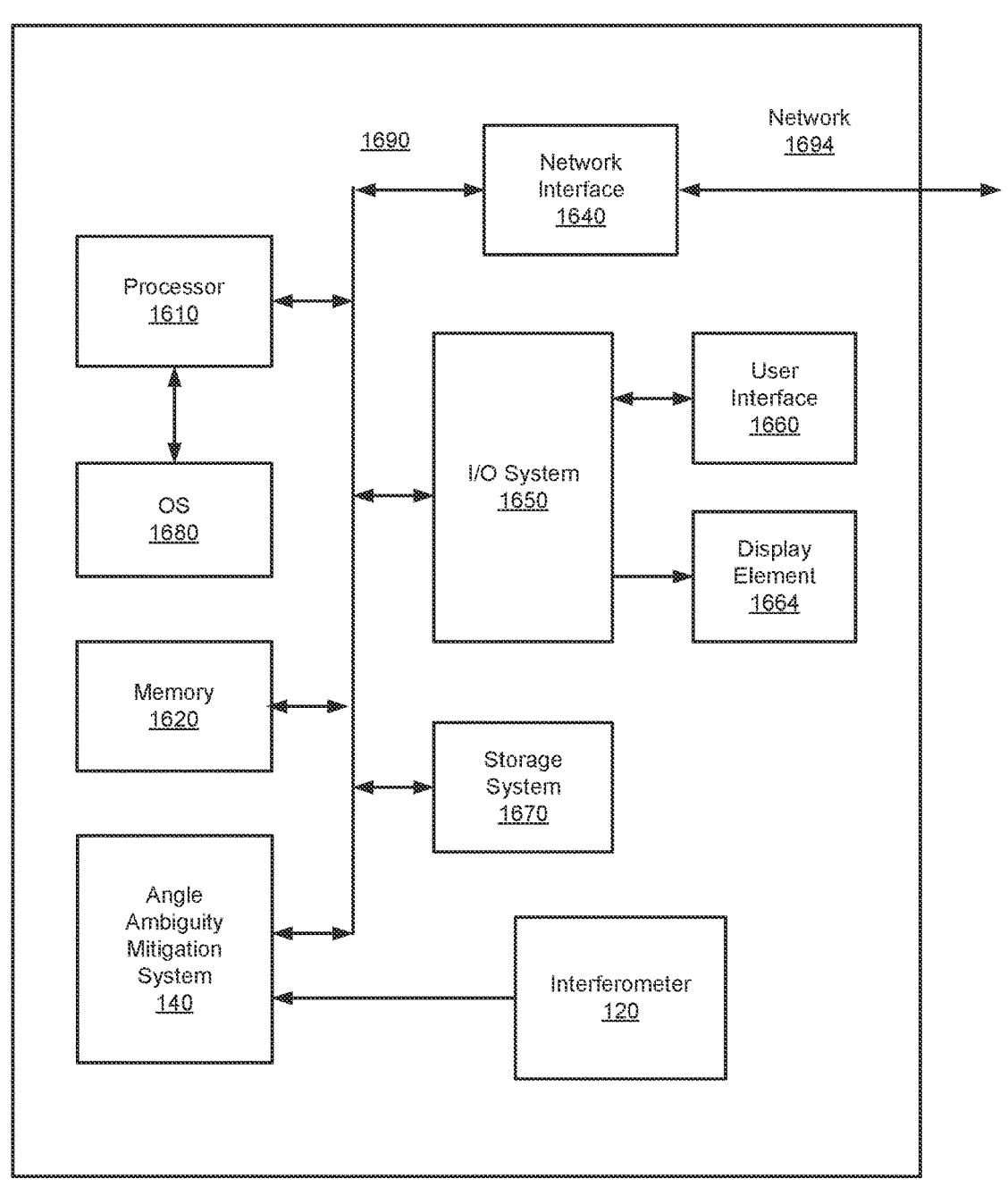
FIG. 16 is a block diagram of a processing platform configured to perform interferometry based angle ambiguity mitigation, in accordance with an embodiment of the present disclosure.

FIG. 16 is a block diagram of a processing platform 1600 configured to perform interferometry based angle ambiguity mitigation, in accordance with an embodiment of the present disclosure. In some embodiments, platform 1600, or portions thereof, may be hosted on, or otherwise be incorporated into the electronic systems of an aircraft or ship, including radar systems, communication systems, and the like. The disclosed techniques may be used to improve the estimation of an object location by reducing interferometric angle ambiguity associated with phase wrap.

In some embodiments, platform 1600 may comprise any combination of a processor 1610, memory 1620, an interferometer 120, an angle ambiguity mitigation system 140, a network interface 1640, an input/output (I/O) system 1650, a user interface 1660, a display element 1664, and a storage system 1670. As can be further seen, a bus and/or interconnect 1690 is also provided to allow for communication between the various components listed above and/or other components not shown. Platform 1600 can be coupled to a network 1694 through network interface 1640 to allow for communications with other computing devices, platforms, devices to be controlled, or other resources. Other componentry and functionality not reflected in the block diagram of FIG. 16 will be apparent in light of this disclosure, and it will be appreciated that other embodiments are not limited to any particular hardware configuration.

Processor 1610 can be any suitable processor, and may include one or more coprocessors or controllers, such as an audio processor, a graphics processing unit, or hardware accelerator, to assist in the execution of mission software and/or any control and processing operations associated with platform 1600, including operation of the angle ambiguity mitigation system 140. In some embodiments, the processor 1610 may be implemented as any number of processor cores. The processor (or processor cores) may be any type of processor, such as, for example, a micro-processor, an embedded processor, a digital signal processor (DSP), a graphics processor (GPU), a tensor processing unit (TPU), a network processor, a field programmable gate array or other device configured to execute code. The processors may be multithreaded cores in that they may include more than one hardware thread context (or "logical processor") per core. Processor 1610 may be implemented as a complex instruction set computer (CISC) or a reduced instruction set computer (RISC) processor. In some embodiments, processor 1610 may be configured as an x86 instruction set compatible processor.

Memory 1620 can be implemented using any suitable type of digital storage including, for example, flash memory and/or random access memory (RAM). In some embodiments, the memory 1620 may include various layers of memory hierarchy and/or memory caches as are known to those of skill in the art. Memory 1620 may be implemented as a volatile memory device such as, but not limited to, a RAM, dynamic RAM (DRAM), or static RAM (SRAM) device. Storage system 1670 may be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

Processor 1610 may be configured to execute an Operating System (OS) 1680 which may comprise any suitable operating system, such as Google Android (Google Inc., Mountain View, CA), Microsoft Windows (Microsoft Corp., Redmond, WA), Apple OS X (Apple Inc., Cupertino, CA), Linux, or a real-time operating system (RTOS). As will be appreciated in light of this disclosure, the techniques provided herein can be implemented without regard to the particular operating system provided in conjunction with platform 1600, and therefore may also be implemented using any suitable existing or subsequently-developed platform.

Network interface circuit 1640 can be any appropriate network chip or chipset which allows for wired and/or wireless connection between other components of platform 1600 and/or network 1694, thereby enabling platform 1600 to communicate with other local and/or remote computing systems, and/or other resources. Wired communication may conform to existing (or yet to be developed) standards, such as, for example, Ethernet. Wireless communication may conform to existing (or yet to be developed) standards, such as, for example, cellular communications including LTE (Long Term Evolution) and 5G, Wireless Fidelity (Wi-Fi), Bluetooth, and/or Near Field Communication (NFC). Exemplary wireless networks include, but are not limited to, wireless local area networks, wireless personal area networks, wireless metropolitan area networks, cellular networks, and satellite networks.

I/O system 1650 may be configured to interface between various I/O devices and other components of platform 1600. I/O devices may include, but not be limited to, user interface 1660 and display element 1664. User interface 1660 may include devices (not shown) such as a touchpad, cockpit display unit, keyboard, and mouse, etc., for example, to allow the user to control the system. Display element 1664 may be configured to display information to a user. I/O system 1650 may include a graphics subsystem configured to perform processing of images for rendering on the display element 1664. Graphics subsystem may be a graphics processing unit or a visual processing unit (VPU), for example. An analog or digital interface may be used to communicatively couple graphics subsystem and the display element. For example, the interface may be any of a high definition multimedia interface (HDMI), DisplayPort, wireless HDMI, and/or any other suitable interface using wireless high definition compliant techniques. In some embodiments, the graphics subsystem could be integrated into processor 1610 or any chipset of platform 1600.

It will be appreciated that in some embodiments, the various components of platform 1600 may be combined or integrated in a system-on-a-chip (SoC) architecture. In some embodiments, the components may be hardware components, firmware components, software components or any suitable combination of hardware, firmware or software.

Angle ambiguity mitigation system 140 is configured to reducing interferometric angle ambiguity associated with phase wrap through the use of Gaussian probability models, as described previously. Angle ambiguity mitigation system 140 may include any or all of the circuits/components illustrated in FIG. 2, as described above. These components can be implemented or otherwise used in conjunction with a variety of suitable software and/or hardware that is coupled to or that otherwise forms a part of platform 1600. These components can additionally or alternatively be implemented or otherwise used in conjunction with user I/O devices that are capable of providing information to, and receiving information and commands from, a user.

In various embodiments, platform 1600 may be implemented as a wireless system, a wired system, or a combination of both. When implemented as a wireless system, platform 1600 may include components and interfaces suitable for communicating over a wireless shared media, such as one or more antennae, transmitters, receivers, transceivers, amplifiers, filters, control logic, and so forth. An example of wireless shared media may include portions of a wireless spectrum, such as the radio frequency spectrum and so forth. When implemented as a wired system, platform 1600 may include components and interfaces suitable for communicating over wired communications media, such as input/output adapters, physical connectors to connect the input/output adaptor with a corresponding wired communications medium, a network interface card (NIC), disc controller, video controller, audio controller, and so forth. Examples of wired communications media may include a wire, cable metal leads, printed circuit board (PCB), backplane, switch fabric, semiconductor material, twisted pair wire, coaxial cable, fiber optics, and so forth.

Various embodiments may be implemented using hardware elements, software elements, or a combination of both. Examples of hardware elements may include processors, microprocessors, circuits, circuit elements (for example, transistors, resistors, capacitors, inductors, and so forth), integrated circuits, ASICs, programmable logic devices, digital signal processors, FPGAs, logic gates, registers, semiconductor devices, chips, microchips, chipsets, and so forth. Examples of software may include software components, programs, applications, computer programs, application programs, system programs, machine programs, operating system software, middleware, firmware, software modules, routines, subroutines, functions, methods, procedures, software interfaces, application program interfaces, instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power level, heat tolerances, processing cycle budget, input data rates, output data rates, memory resources, data bus speeds, and other design or performance constraints.

Some embodiments may be described using the expression "coupled" and "connected" along with their derivatives. These terms are not intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still cooperate or interact with each other.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. The instructions can be encoded using a suitable programming language, such as C, C++, object oriented C, Java, JavaScript, Visual Basic. NET, Beginner's All-Purpose Symbolic Instruction Code (BASIC), or alternatively, using custom or proprietary instruction sets. The instructions can be provided in the form of one or more computer software applications and/or applets that are tangibly embodied on a memory device, and that can be executed by a computer having any suitable architecture. In one embodiment, the system can be hosted on a given website and implemented, for example, using JavaScript or another suitable browser-based technology. For instance, in certain embodiments, the system may leverage processing resources provided by a remote computer system accessible via network 1694. The computer software applications disclosed herein may include any number of different modules, sub-modules, or other components of distinct functionality, and can provide information to, or receive information from, still other components. These modules can be used, for example, to communicate with input and/or output devices such as a display screen, a touch sensitive surface, a printer, and/or any other suitable device. Other componentry and functionality not reflected in the illustrations will be apparent in light of this disclosure, and it will be appreciated that other embodiments are not limited to any particular hardware or software configuration. Thus, in other embodiments platform 1600 may comprise additional, fewer, or alternative subcomponents as compared to those included in the example embodiment of FIG. 16.

The aforementioned non-transitory computer readable medium may be any suitable medium for storing digital information, such as a hard drive, a server, a flash memory, and/or random-access memory (RAM), or a combination of memories. In alternative embodiments, the components and/or modules disclosed herein can be implemented with hardware, including gate level logic such as a field-programmable gate array (FPGA), or alternatively, a purpose-built semiconductor such as an application-specific integrated circuit (ASIC). Still other embodiments may be implemented with a microcontroller having a number of input/output ports for receiving and outputting data, and a number of embedded routines for carrying out the various functionalities disclosed herein. It will be apparent that any suitable combination of hardware, software, and firmware can be used, and that other embodiments are not limited to any particular system architecture.

Some embodiments may be implemented, for example, using a machine readable medium or article which may store an instruction or a set of instructions that, if executed by a machine, may cause the machine to perform a method, process, and/or operations in accordance with the embodiments. Such a machine may include, for example, any suitable processing platform, computing platform, computing device, processing device, computing system, processing system, computer, process, or the like, and may be implemented using any suitable combination of hardware and/or software. The machine readable medium or article may include, for example, any suitable type of memory unit, memory device, memory article, memory medium, storage device, storage article, storage medium, and/or storage unit, such as memory, removable or non-removable media, erasable or non-erasable media, writeable or rewriteable media, digital or analog media, hard disk, floppy disk, compact disk read only memory (CD-ROM), compact disk recordable (CD-R) memory, compact disk rewriteable (CD-RW) memory, optical disk, magnetic media, magneto-optical media, removable memory cards or disks, various types of digital versatile disk (DVD), a tape, a cassette, or the like. The instructions may include any suitable type of code, such as source code, compiled code, interpreted code, executable code, static code, dynamic code, encrypted code, and the like, implemented using any suitable high level, low level, object oriented, visual, compiled, and/or interpreted programming language.

Unless specifically stated otherwise, it may be appreciated that terms such as "processing," "computing," "calculating," "determining," or the like refer to the action and/or process of a computer or computing system, or similar electronic computing device, that manipulates and/or transforms data represented as physical quantities (for example, electronic) within the registers and/or memory units of the computer system into other data similarly represented as physical entities within the registers, memory units, or other such information storage transmission or displays of the computer system. The embodiments are not limited in this context.

The terms "circuit" or "circuitry," as used in any embodiment herein, are functional and may comprise, for example, singly or in any combination, hardwired circuitry, programmable circuitry such as computer processors comprising one or more individual instruction processing cores, state machine circuitry, and/or firmware that stores instructions executed by programmable circuitry. The circuitry may include a processor and/or controller configured to execute one or more instructions to perform one or more operations described herein. The instructions may be embodied as, for example, an application, software, firmware, etc. configured to cause the circuitry to perform any of the aforementioned operations. Software may be embodied as a software package, code, instructions, instruction sets and/or data recorded on a computer-readable storage device. Software may be embodied or implemented to include any number of processes, and processes, in turn, may be embodied or implemented to include any number of threads, etc., in a hierarchical fashion. Firmware may be embodied as code, instructions or instruction sets and/or data that are hardcoded (e.g., nonvolatile) in memory devices. The circuitry may, collectively or individually, be embodied as circuitry that forms part of a larger system, for example, an integrated circuit (IC), an application-specific integrated circuit (ASIC), a system-on-a-chip (SoC), desktop computers, laptop computers, tablet computers, servers, smartphones, etc. Other embodiments may be implemented as software executed by a programmable control device. In such cases, the terms "circuit" or "circuitry" are intended to include a combination of software and hardware such as a programmable control device or a processor capable of executing the software. As described herein, various embodiments may be implemented using hardware elements, software elements, or any combination thereof. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

Numerous specific details have been set forth herein to provide a thorough understanding of the embodiments. It will be understood, however, that other embodiments may be practiced without these specific details, or otherwise with a different set of details. It will be further appreciated that the specific structural and functional details disclosed herein are representative of example embodiments and are not necessarily intended to limit the scope of the present disclosure. In addition, although the subject matter has been described in language specific to structural features and/or methodological acts, it is to be understood that the subject matter defined in the appended claims is not necessarily limited to the specific features or acts described herein. Rather, the specific features and acts described herein are disclosed as example forms of implementing the claims.

Further Example Embodiments

The following examples pertain to further embodiments, from which numerous permutations and configurations will be apparent.

Example 1 is a computer program product including one or more non-transitory machine-readable mediums encoded with instructions that when executed by one or more processors cause a process to be carried out for interferometric angle ambiguity mitigation, the process comprising: measuring a differential phase of a signal received at a currently selected baseline of a plurality of baselines of an interferometer; calculating a conditional probability of an angle of arrival (AOA) of the signal based on the measured differential phase; calculating a current angular position probability of an object in a target frame of reference based on the conditional probability of the AOA; selecting a next baseline of the plurality of baselines as the currently selected baseline and iterating the process to calculate a next angular position probability based on the selected next baseline; and selecting an angular position probability of greatest likelihood, from the current angular position probabilities, based on an amplitude of a lobe of the conditional probability, the selected angular position probability associated with a disambiguated angular position of the object.

Example 2 includes the computer program product of Example 1, wherein the process further comprises aggregating the current angular position probability with previously calculated angular position probabilities, the previously calculated angular position probabilities based on previously selected baselines of the plurality of baselines.

Example 3 includes the computer program product of Example 2, wherein the aggregation is performed as a recursive multiplicative product.

Example 4 includes the computer program product of any of Examples 1-3, wherein the process further comprises modeling the lobe of the conditional probability as a Gaussian distribution and calculating a mean of the Gaussian distribution for each of a set of phase wrap ambiguities of the measured differential phase, and to calculate a variance of the Gaussian distribution based on a signal to noise ratio of the received signal.

Example 5 includes the computer program product of Example 4, wherein the process further comprises calculating the conditional probability as a sum of the Gaussian distributions associated with the phase wrap ambiguities.

Example 6 includes the computer program product of any of Examples 1-5, wherein the process further comprises calculating the current angular position probability by applying a rotation matrix to the conditional probability, the rotation matrix based on a cant angle of the currently selected baseline.

Example 7 includes the computer program product of any of Examples 1-6, wherein the process further comprises culling the angular position probabilities based on a comparison of the amplitudes of the lobes of the conditional probabilities to a threshold value.

Example 8 is an interferometric angle ambiguity mitigation system comprising: a phase measurement circuit configured to measure a differential phase of a signal received at a currently selected baseline of a plurality of baselines of an interferometer; a conditional probability calculator configured to calculate a conditional probability of an angle of arrival (AOA) of the signal based on the measured differential phase; an angular position probability calculator configured to calculate an angular position probability of an object of the signal in a target frame of reference based on the conditional probability of the AOA; a baseline aggregation calculator configured to aggregate the angular position probability with previously calculated angular position probabilities to generate a current angular position probability, the previously calculated angular position probabilities based on previously selected baselines of the plurality of baselines; an iteration circuit configured to select a next baseline of the plurality of baselines as the currently selected baseline to iteratively calculate a next angular position probability; and a likelihood sorting circuit configured to select an angular position probability of greatest likelihood, from the current and the previously calculated angular position probabilities, based on an amplitude of a lobe of the conditional probability, the selected angular position probability associated with a disambiguated angular position of the object.

Example 9 includes the system of Example 8, wherein the conditional probability calculator is configured to model the lobe of the conditional probability as a Gaussian distribution, calculate a mean of the Gaussian distribution for each of a set of phase wrap ambiguities of the measured differential phase, and calculate a variance of the Gaussian distribution based on a signal to noise ratio of the received signal.

Example 10 includes the system of Example 9, wherein the conditional probability calculator is configured to calculate the conditional probability as a sum of the Gaussian distributions associated with the phase wrap ambiguities.

Example 11 includes the system of any of Examples 8-10, wherein the angular position probability calculator is configured to calculate the angular position probability by applying a rotation matrix to the conditional probability, the rotation matrix based on a cant angle of the currently selected baseline.

Example 12 includes the system of any of Examples 8-11, wherein the aggregation of the angular position probabilities is performed as a recursive multiplicative product.

Example 13 includes the system of any of Examples 8-12, wherein the baseline aggregation calculator is further configured to cull the angular position probabilities based on a comparison of amplitudes of the lobes of the conditional probabilities to a threshold value.

Example 14 includes the system of any of Examples 8-13, wherein the baselines of the plurality of baselines are configured in a colinear arrangement, a coplanar arrangement, or a three dimensional arrangement.

Example 15 is a method for interferometric angle ambiguity mitigation, the method comprising: measuring, by a processor-based system, a differential phase of a signal received at a currently selected baseline of a plurality of baselines of an interferometer; calculating, by the processor-based system, a conditional probability of an angle of arrival (AOA) of the signal based on the measured differential phase, wherein the conditional probability is modeled as a Gaussian distribution; calculating, by the processor-based system, an angular position probability of an object of the signal in a target frame of reference based on the conditional probability of the AOA; aggregating, by the processor-based system, the angular position probability with previously calculated angular position probabilities to generate a current angular position probability, the previously calculated angular position probabilities based on previously selected baselines of the plurality of baselines; selecting, by the processor-based system, a next baseline of the plurality of baselines as the currently selected baseline and iterating the method to calculate a next angular position probability based on the selected next baseline; and selecting, by the processor-based system, an angular position probability of greatest likelihood, from the current and the previously calculated angular position probabilities, based on an amplitude of a lobe of the conditional probability, the selected angular position probability associated with a disambiguated angular position of the object.

Example 16 includes the method of Example 15, further comprising calculating a mean of the Gaussian distribution for each of a set of phase wrap ambiguities of the measured differential phase, and to calculate a variance of the Gaussian distribution based on a signal to noise ratio of the received signal.

Example 17 includes the method of Example 16, further comprising calculating the conditional probability as a sum of the Gaussian distributions associated with the phase wrap ambiguities.

Example 18 includes the method of any of Examples 15-17, further comprising calculating the angular position probability by applying a rotation matrix to the conditional probability, the rotation matrix based on a cant angle of the currently selected baseline.

Example 19 includes the method of any of Examples 15-18, further comprising aggregating of the angular position probabilities as a recursive multiplicative product.

Example 20 includes the method of any of Examples 15-19, further comprising culling the angular position probabilities based on a comparison of amplitudes of the Gaussian distributions to a threshold value.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be appreciated in light of this disclosure. The present disclosure should, therefore, be considered to encompass such combinations, variations, and modifications. It is intended that the scope of the present disclosure be limited not by this detailed description, but rather by the claims appended hereto. Future filed applications claiming priority to this application may claim the disclosed subject matter in a different manner and may generally include any set of one or more elements as variously disclosed or otherwise demonstrated herein.

What is claimed is:

1. A computer program product including one or more non-transitory machine-readable mediums encoded with instructions that when executed by one or more processors cause a process to be carried out for interferometric angle ambiguity mitigation, the process comprising:

measuring a differential phase of a signal received at a currently selected baseline of a plurality of baselines of an interferometer;

calculating a conditional probability of an angle of arrival (AOA) of the signal based on the measured differential phase;

calculating a current angular position probability of an object in a target frame of reference based on the conditional probability of the AOA;

selecting a next baseline of the plurality of baselines as the currently selected baseline and iterating the process to calculate a next angular position probability based on the selected next baseline;

selecting an angular position probability of greatest likelihood, from the current angular position probabilities, based on an amplitude of a lobe of the conditional probability, the selected angular position probability associated with a disambiguated angular position of the object; and outputting the disambiguated angular position of the object to at least one of a guidance system, a direction finding (DF) system, a targeting system, a network interface, an input/output (I/O) system, a user interface, or a display element.

2. The computer program product of claim 1, wherein the process further comprises aggregating the current angular position probability with previously calculated angular position probabilities, the previously calculated angular position probabilities based on previously selected baselines of the plurality of baselines.

3. The computer program product of claim 2, wherein the aggregation is performed as a recursive multiplicative product.

4. The computer program product of claim 1, wherein the process further comprises modeling the lobe of the conditional probability as a Gaussian distribution and calculating a mean of the Gaussian distribution for each of a set of phase wrap ambiguities of the measured differential phase, and to calculate a variance of the Gaussian distribution based on a signal to noise ratio of the received signal.

5. The computer program product of claim 4, wherein the process further comprises calculating the conditional probability as a sum of the Gaussian distributions associated with the phase wrap ambiguities.

6. The computer program product of claim 1, wherein the process further comprises calculating the current angular position probability by applying a rotation matrix to the conditional probability, the rotation matrix based on a cant angle of the currently selected baseline.

7. The computer program product of claim 1, wherein the process further comprises culling the angular position probabilities based on a comparison of the amplitudes of the lobes of the conditional probabilities to a threshold value.

8. An interferometric angle ambiguity mitigation system comprising:

a phase measurement circuit configured to measure a differential phase of a signal received at a currently selected baseline of a plurality of baselines of an interferometer;

a conditional probability calculator configured to calculate a conditional probability of an angle of arrival (AOA) of the signal based on the measured differential phase;

an angular position probability calculator configured to calculate an angular position probability of an object of the signal in a target frame of reference based on the conditional probability of the AOA;

a baseline aggregation calculator configured to aggregate the angular position probability with previously calculated angular position probabilities to generate a current angular position probability, the previously calculated angular position probabilities based on previously selected baselines of the plurality of baselines;

an iteration circuit configured to select a next baseline of the plurality of baselines as the currently selected baseline to iteratively calculate a next angular position probability;

a likelihood sorting circuit configured to select an angular position probability of greatest likelihood, from the current and the previously calculated angular position probabilities, based on an amplitude of a lobe of the conditional probability, the selected angular position probability associated with a disambiguated angular position of the object; and an input/output (I/O) system configured to output the disambiguated angular position of the object to at least one of a guidance system, a direction finding (DF) system, a targeting system, a network interface, a user interface, or a display element.

9. The system of claim 8, wherein the conditional probability calculator is configured to model the lobe of the conditional probability as a Gaussian distribution, calculate a mean of the Gaussian distribution for each of a set of phase wrap ambiguities of the measured differential phase, and calculate a variance of the Gaussian distribution based on a signal to noise ratio of the received signal.

10. The system of claim 9, wherein the conditional probability calculator is configured to calculate the conditional probability as a sum of the Gaussian distributions associated with the phase wrap ambiguities.

11. The system of claim 8, wherein the angular position probability calculator is configured to calculate the angular position probability by applying a rotation matrix to the conditional probability, the rotation matrix based on a cant angle of the currently selected baseline.

12. The system of claim 8, wherein the aggregation of the angular position probabilities is performed as a recursive multiplicative product.

13. The system of claim 8, wherein the baseline aggregation calculator is further configured to cull the angular position probabilities based on a comparison of amplitudes of the lobes of the conditional probabilities to a threshold value.

14. The system of claim 8, wherein the baselines of the plurality of baselines are configured in a colinear arrangement, a coplanar arrangement, or a three dimensional arrangement.

15. A method for interferometric angle ambiguity mitigation, the method comprising:

measuring, by a processor-based system, a differential phase of a signal received at a currently selected baseline of a plurality of baselines of an interferometer;

calculating, by the processor-based system, a conditional probability of an angle of arrival (AOA) of the signal based on the measured differential phase, wherein the conditional probability is modeled as a Gaussian distribution;

calculating, by the processor-based system, an angular position probability of an object of the signal in a target frame of reference based on the conditional probability of the AOA;

aggregating, by the processor-based system, the angular position probability with previously calculated angular position probabilities to generate a current angular position probability, the previously calculated angular position probabilities based on previously selected baselines of the plurality of baselines;

selecting, by the processor-based system, a next baseline of the plurality of baselines as the currently selected baseline and iterating the method to calculate a next angular position probability based on the selected next baseline;

selecting, by the processor-based system, an angular position probability of greatest likelihood, from the current and the previously calculated angular position probabilities, based on an amplitude of a lobe of the conditional probability, the selected angular position probability associated with a disambiguated angular position of the object; and outputting, by the processor-based system, the disambiguated angular position of the object to at least one of a guidance system, a direction finding (DF) system, a targeting system, a network interface, an input/output (I/O) system, a user interface, or a display element.

16. The method of claim 15, further comprising calculating a mean of the Gaussian distribution for each of a set of phase wrap ambiguities of the measured differential phase, and to calculate a variance of the Gaussian distribution based on a signal to noise ratio of the received signal.

17. The method of claim 16, further comprising calculating the conditional probability as a sum of the Gaussian distributions associated with the phase wrap ambiguities.

18. The method of claim 15, further comprising calculating the angular position probability by applying a rotation matrix to the conditional probability, the rotation matrix based on a cant angle of the currently selected baseline.

19. The method of claim 15, further comprising aggregating of the angular position probabilities as a recursive multiplicative product.

20. The method of claim 15, further comprising culling the angular position probabilities based on a comparison of amplitudes of the Gaussian distributions to a threshold value.

* * * * *